US012724145B2

(12) United States Patent
Wang et al.

(10) Patent No.: US 12,724,145 B2
(45) Date of Patent: Sep. 1, 2026

(54) SIGNAL PROCESSING METHOD AND APPARATUS

(71) Applicant: Yinwang Intelligent Technologies Co., Ltd., Shenzhen (CN)

(72) Inventors: Yikai Wang, Chengdu (CN); Qian Yin, Shanghai (CN); Zengfei Cheng, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 451 days.

(21) Appl. No.: 17/846,906

(22) Filed: Jun. 22, 2022

(65) Prior Publication Data

US 2022/0326376 A1 Oct. 13, 2022

Related U.S. Application Data

(63) Continuation of application No. PCT/CN2020/138132, filed on Dec. 21, 2020.

(30) Foreign Application Priority Data

Dec. 23, 2019 (CN) ........................ 201911342739.X

(51) Int. Cl.
*G01S 13/931* (2020.01)
*G01S 13/58* (2006.01)

(52) U.S. Cl.
CPC ............ *G01S 13/931* (2013.01); *G01S 13/58* (2013.01)

(58) Field of Classification Search
None
See application file for complete search history.

(56) References Cited

U.S. PATENT DOCUMENTS 7,205,933 B1 4/2007 Snodgrass
7,345,621 B2 3/2008 Bourdelais et al.
(Continued)

FOREIGN PATENT DOCUMENTS

CN 103675784 A 3/2014
CN 103998951 A 8/2014
(Continued)

OTHER PUBLICATIONS

Roos et al., "Enhancement of Doppler Unambiguity for Chirp-Sequence Modulated TDM-MIMO Radars," 2018 IEEE MTT-S International Conference on Microwaves for Intelligent Mobility (ICMIM), Total 4 pages, Institute of Electrical and Electronics Engineers, New York, New York (Apr. 15-17, 2018).
(Continued)

*Primary Examiner* — Vladimir Magloire
*Assistant Examiner* — Ashley Brown Raynal
(74) *Attorney, Agent, or Firm* — Leydig, Voit & Mayer, Ltd.

(57) ABSTRACT

A signal processing method and apparatus, applied to the field of automatic driving or intelligent driving, in particular to millimeter wave radar target detection are provided. The method includes: a detection apparatus receives at least one first signal corresponding to a first transmit antenna, and performs beamforming processing on the at least one first signal to generate a first beam; and determines information about the first target based on the first beam and a phase of a second beam corresponding to at least one second signal. According to this application, the detection apparatus such as a single-input multiple-output (SIMO) radar, a multiple-input multiple-output (MIMO) radar or a cooperative radar, may determine, based on a phase of the first beam and the phase of the second beam, a Doppler phase difference, and
(Continued)

determine, based on the Doppler phase difference, the information about the first target.

20 Claims, 6 Drawing Sheets

(56) References Cited

U.S. PATENT DOCUMENTS

| | | | | |
|---|---|---|---|---|
| 2006/0071847 | A1* | 4/2006 | Fiore | G01S 13/44 342/107 |
| 2008/0291088 | A1* | 11/2008 | Nagai | G01S 13/48 342/374 |
| 2012/0092217 | A1* | 4/2012 | Hosoya | H04B 7/086 342/373 |
| 2015/0323660 | A1 | 11/2015 | Hampikian | |
| 2016/0131752 | A1* | 5/2016 | Jansen | G01S 13/42 342/27 |
| 2017/0013139 | A1 | 1/2017 | Suzuki | |
| 2019/0339376 | A1* | 11/2019 | Levy-Israel | G01S 13/536 |

FOREIGN PATENT DOCUMENTS

| | | | | | |
|---|---|---|---|---|---|
| CN | 106796282 | A | | 5/2017 | |
| CN | 108594233 | A | | 9/2018 | |
| CN | 109975806 | A | * | 7/2019 | G01S 7/418 |
| CN | 110441774 | A | | 11/2019 | |
| DE | 102014212280 | A1 | | 12/2015 | |
| DE | 102014212284 | A1 | | 12/2015 | |
| DE | 102018203333 | A1 | | 9/2019 | |

OTHER PUBLICATIONS

Schmid et al., "Motion Compensation and Efficient Array Design for TDMA FMCW MIMO Radar Systems," 6th European Conference on Antennas and Propagation (EUCAP), pp. 1746-1750, Institute of Electrical and Electronics Engineers, New York, New York (Mar. 26-30, 2012).

* cited by examiner

T=3, R=4

Transmit antenna array

1 T1 2 T2 T3

Receive antenna array R1 R2 R3 R4

1 2 3 4

⟹ T x R = 12 virtual array elements

(0,0) (1,0) (2,0) (3,0) (0,1) (1,1) (2,1) (3,1) (0,2) (1,2) (2,2) (3,2)

1 2 3 4 5 6 7 8 9 10 11 12

S400: A detection apparatus receives at least one first signal corresponding to a first transmit antenna

↓

S401: The detection apparatus performs beamforming processing on the at least one first signal to generate a first beam

↓

S402: The detection apparatus determines information about a first target based on a phase of the first beam and a phase of a second beam Target 1
Target 2
Beam 1
Beam 2
Transmit antenna 1
Transmit antenna 2
TX
RX Target 1
Target 2
Beam 1 TDM 1
Beam 2 TDM 2
Transmit antenna 1
TX
RX
TDM 1
TDM 2

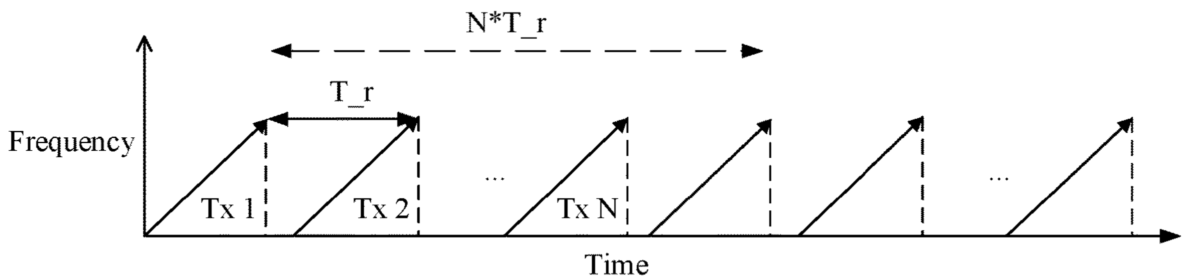

FIG. 7

TDM time-sharing transmission with Doppler phase introduction

$$\phi = 2\pi\left(\frac{d_{Tx}\sin\theta}{\lambda} + f_d T_r\right)$$

φ φ

1 T1 2 T2 T3 3

$d_{Tx} = R * d_{Rx}$ d_Tx

R1 R2 R3 R4

1 2 3 4

$d_{Rx} = \frac{\lambda}{2}$ d_Rx

⟹ T x R = 12 virtual receive antennas

(0,0) (1,0) (2,0) (3,0) (0,1) (1,1) (2,1) (3,1) (0,2) (1,2) (2,2) (3,2)

1 2 3 4 5 6 7 8 9 10 11 12

φ φ1

$$\varphi = 2\pi\frac{d_{Rx}\sin\theta}{\lambda}$$

$$\phi 1 = 2\pi\left(\frac{d_{Rx}\sin\theta}{\lambda} + f_d T_r\right)$$

No Doppler phase in a subarray

Doppler phase introduced between subarrays

FIG. 8

SIGNAL PROCESSING METHOD AND APPARATUS

CROSS-REFERENCE TO RELATED APPLICATIONS

This application is a continuation of International Application No. PCT/CN2020/138132, filed on Dec. 21, 2020, which claims priority to Chinese Patent Application No. 201911342739.X, filed on Dec. 23, 2019. The disclosures of the aforementioned applications are hereby incorporated by reference in their entireties.

TECHNICAL FIELD

Embodiments of this application relate to the field of autonomous driving technologies or assisted driving technologies, and in particular, to a signal processing method and an apparatus.

BACKGROUND

With development of society, intelligent vehicles are gradually entering people's daily life. A sensor plays a quite important role in assistant driving and autonomous driving of the intelligent vehicle. Various sensors installed on the vehicle can sense a surrounding environment, collect data, and identify and track moving objects at any time during a traveling process of the vehicle, and can identify a static scene such as a lane line and a signboard and plan a route. The sensors can detect a potential danger in advance, and help a driver take a necessary avoidance means in a timely manner or even autonomously take a necessary avoidance means, so that driving safety and comfort of the vehicle are effectively improved.

In the field of autonomous driving or assisted driving, the sensor may include detection apparatuses such as a millimeter wave radar, a laser radar, a camera, and an ultrasonic radar. In a driving process, safety is a quite important factor, which imposes requirements for detection on a road environment and a target object. How the detection apparatus, especially a radar apparatus, detects related information of the target object is a problem to be resolved by embodiments of this application.

SUMMARY

Embodiments of this application provide a signal processing method and an apparatus, to detect related information of a target object by a detection apparatus.

According to a first aspect, a signal processing method is provided. The method is applied to a detection apparatus, and the detection apparatus includes at least a first transmit antenna. The detection apparatus may receive at least one first signal corresponding to the first transmit antenna, and perform beamforming processing on the at least one first signal to generate a first beam. The detection apparatus may determine information about a first target based on a phase of the first beam and a phase of a second beam. The second beam corresponds to at least one second signal received by the detection apparatus, and there is a first time difference between the first beam and the second beam.

The beamforming may be implemented in a manner such as Fourier transform, adaptive beamforming, or minimum variance distortionless response (MVDR), which is not limited. The beamforming is implemented, for example, by using Fourier transform, and the performing beamforming processing on the at least one first signal to generate a first beam includes: the detection apparatus may perform Fourier transform on the at least one first signal to obtain a plurality of beams, and determine the first beam in the plurality of beams. For example, a beam with strongest energy in the plurality of beams may be selected as the first beam. In a possible implementation, the at least one first signal may include at least two first signals, and the at least one second signal may include at least two second signals.

According to the foregoing method, the detection apparatus determines the information about the first target based on the phase of the first beam and the phase of the second beam, thereby implementing detection of a target object. Further, the detection apparatus may determine a Doppler phase difference based on the phase of the first beam and the phase of the second beam, and can resolve velocity ambiguity based on the Doppler phase difference, thereby further improving accuracy in detecting a target by the detection apparatus.

The mentioned velocity ambiguity means a phenomenon that when a moving velocity of the target object exceeds a range of a detection velocity of the detection apparatus, a velocity detected by the detection apparatus is incorrect. For example, a range of a detection velocity of the detection apparatus is [−6, 6] km/h. If an actual moving velocity of the target object relative to the detection apparatus is 8 km/h, however, because 8 km/h is beyond the detection range of the detection apparatus, a moving velocity of the target object relative to the detection apparatus and detected by the detection apparatus is possibly 2 km/h.

In order to resolve the foregoing velocity ambiguity problem, in a solution, during design of an antenna array of the detection apparatus, virtual subarrays corresponding to two different groups of transmit antennas are enabled to have overlapping array elements. A phase difference of overlapping virtual subarrays is caused only by a Doppler phase difference. Therefore, the Doppler phase difference can be determined by measuring the phase difference of the overlapping virtual subarrays, the velocity ambiguity can be resolved based on the Doppler phase difference. However, in the foregoing manner of designing overlapping virtual subarrays, there are the following problems: reduction of an array aperture, inconvenience for system design, and vulnerability to impact by an array error. During design of the foregoing first aspect, the detection apparatus may separately perform beamforming on the at least one first signal and the at least one second signal, to obtain the first beam and the second beam. The Doppler phase difference can be determined based on the first beam, the second beam, and the phases of the two beams, so that the velocity ambiguity can be resolved. It can be learned that in the foregoing design of the first aspect, there is no need to dispose virtual subarrays of the detection apparatus in an overlapping manner. Therefore, this can resolve the foregoing problems caused by the foregoing overlapping virtual subarrays, such as reduction of an array aperture, inconvenience for system design, and vulnerability to impact by an array error.

In a possible design, the second beam is generated after beamforming processing is performed on at least one second signal. For example, the detection apparatus may perform beamforming on the at least one second signal to generate the second beam. In addition to the foregoing first transmit antenna, the detection apparatus may further include a second transmit antenna, and the at least one second signal may be a signal corresponding to the first transmit antenna, or a signal corresponding to the second transmit antenna, or the like, which is not limited.

In a possible design, that the detection apparatus determines the information about the first target based on the phase of the first beam and the phase of the second beam is specifically: the detection apparatus determines the Doppler phase difference based on the phase of the first beam and the phase of the second beam, and the detection apparatus determines the information about the first target based on the Doppler phase difference.

For example, the detection apparatus may determine a velocity ambiguity coefficient based on the Doppler phase difference. Then, a true Doppler frequency shift can be determined based on the velocity ambiguity coefficient. Further, a velocity, an angle, and/or a distance of the target object can be determined based on the true Doppler frequency shift, to reduce impact of velocity ambiguity on the detection apparatus.

In a possible design, the at least one second signal corresponds to the second transmit antenna, and that the detection apparatus determines the Doppler phase difference based on the phase of the first beam and the phase of the second beam is specifically: the detection apparatus determines a first phase difference based on the phase of the first beam and the phase of the second beam; the detection apparatus determines a second phase difference based on a phase of the first transmit antenna and a phase of the second transmit antenna; and the detection apparatus determines the Doppler phase difference based on the first phase difference and the second phase difference. For example, the Doppler phase difference may be specifically a difference between the first phase difference and the second phase difference. For example, if the first phase difference is 91 degrees and the second phase difference is 90 degrees, the Doppler phase difference may be 1 degree.

According to the foregoing method, the detection apparatus may include the first transmit antenna and the second transmit antenna, and the first transmit antenna transmits a signal, which is reflected by the target object to form the at least one first signal. A receiving subarray of the detection apparatus can receive the at least one first signal. Beamforming processing is performed on the at least one first signal to generate the first beam. Similarly, the second transmit antenna can transmit a signal, which is reflected by the target object to form the at least one second signal. The receiving subarray of the detection apparatus can receive the at least one second signal. Beamforming processing is performed on the at least one second signal to generate the second beam. Because the first transmit antenna and the second transmit antenna are different antennas, there is a spatial phase difference. Therefore, a phase difference between the first beam and the second beam not only includes the Doppler phase difference, but also includes the spatial phase difference between the two transmit antennas. To be specific, a sum of the spatial phase difference between the two transmit antennas and the Doppler phase difference is equal to the phase difference between the first beam and the second beam. Therefore, the detection apparatus can calculate the phase difference between the first beam and the second beam, and the spatial phase difference between the first transmit antenna and the second transmit antenna, to determine the Doppler phase difference. For example, if the phase difference between the first beam and the second beam is 90.5 degrees, and the spatial phase difference between the first transmit antenna and the second transmit antenna is 90 degrees, it can be determined that the Doppler phase difference is 0.5 degrees. Further, impact of the Doppler phase difference on the detection apparatus can be eliminated or mitigated.

In a possible design, the at least one first signal corresponds to a first virtual subarray, and the at least one second signal corresponds to a second virtual subarray.

According to the foregoing method, in the detection apparatus, a subarray receiving the first signal may be referred to as the first virtual subarray, and a subarray receiving the second signal may be referred to as a second virtual subarray. This may also be described as: the first transmit antenna corresponds to the first virtual subarray, and the second transmit antenna corresponds to the second virtual subarray, and so on.

In a possible design, the at least one second signal corresponds to the first transmit antenna, and that the detection apparatus determines the Doppler phase difference based on the phase of the first beam and the phase of the second beam is specifically: the detection apparatus determines a first phase difference based on the phase of the first beam and the phase of the second beam, and the detection apparatus determines the Doppler phase difference based on the first phase difference.

According to the foregoing method, the detection apparatus includes the first transmit antenna, and the first transmit antenna may belong to different TDM groups, for example, the first transmit antenna belongs to both a first TDM group and a second TDM group. In this case, the first transmit antenna may transmit a signal in a time period corresponding to the first TDM group, and the signal may be reflected by the target object to form the at least one first signal. A virtual subarray of the detection apparatus may receive the at least one first signal, and perform beamforming on the at least one first signal to generate the first beam. In addition, the first transmit antenna may transmit a signal in a time period corresponding to the second TDM group, and the signal may be reflected by the target object to form the at least one second signal. The detection apparatus may perform beamforming on the at least one second signal to generate the second beam. The first signal and the second signal are transmitted by the same first transmit antenna. Therefore, the phase difference between the first beam and the second beam includes only the Doppler phase difference, and does not include the spatial phase difference between different transmit antennas. In other words, the phase difference between the first beam and the second beam is equal to the Doppler phase difference. In this design, the two TDM groups use the same antenna for transmitting, which can effectively mitigate impact of arrays, antenna errors, and the like on Doppler phase difference measurement.

In a possible design, the at least one first signal and the at least one second signal correspond to a first virtual subarray.

In a possible design, a first pointing angle of the first beam and a second pointing angle of the second beam indicate the first target, and/or an angle difference between the first pointing angle of the first beam and the second pointing angle of the second beam is less than or equal to a first threshold, and/or a difference between energy of the first beam and energy of the second beam is less than or equal to a second threshold.

In a possible design, the information about the first target includes at least one of the angle, the velocity, or the distance of the first target.

In a possible design, the first time difference is a time difference between different time division multiplexing TDM groups.

For example, in an example, the detection apparatus includes N TDM groups, and the N TDM groups use transmitting in a time division manner. It is assumed that the N TDM groups include an $L^{th}$ TDM group and a $K^{th}$ TDM group, L and K are both integers greater than or equal to 1 and less than or equal to N, the $L^{th}$ TDM group includes the first transmit antenna, and the $K^{th}$ TDM group includes the second transmit antenna. The first transmit antenna of the detection apparatus transmits the first signal in a time period corresponding to the $L^{th}$ TDM group. The second transmit antenna of the detection apparatus transmits the second signal in a time period corresponding to the $K^{th}$ TDM group. The first time difference may be a time difference between the $L^{th}$ TDM group and the $K^{th}$ TDM group. Alternatively, in another example, it is assumed that the N TDM groups of the detection apparatus include an $M^{th}$ TDM group and a $P^{th}$ TDM group, and M and P are integers greater than or equal to 1 and less than or equal to N. It is assumed that the $M^{th}$ TDM group includes the first transmit antenna, and the first transmit antenna of the detection apparatus transmits the first signal in a time period corresponding to the $M^{th}$ TDM group. The $P^{th}$ TDM group also includes the first transmit antenna, and the first transmit antenna of the detection apparatus transmits the second signal in a time period corresponding to the $P^{th}$ TDM group. The first time difference may be a time difference between the $M^{th}$ TDM group and the $P^{th}$ TDM group.

According to a second aspect, an apparatus is provided. The apparatus may be a detection apparatus, or may be apparatus in the detection apparatus, such as an apparatus in a vehicle-mounted terminal or an apparatus in a radar. The apparatus may include a processing unit and a communications unit, and the processing unit and the communications unit may perform corresponding functions in any design of the first aspect. Specifically:

The communications unit is configured to receive at least one first signal corresponding to a first transmit antenna. The processing unit is configured to perform beamforming processing on the at least one first signal to generate a first beam. The processing unit is further configured to determine information about a first target based on a phase of the first beam and a phase of a second beam.

The second beam corresponds to at least one second signal received by the detection apparatus, and there is a first time difference between the first beam and the second beam.

In a possible design, the second beam is generated after beamforming processing is performed on at least one second signal.

In a possible design, when determining the information about the first target based on the phase of the first beam and the phase of the second beam, the processing unit is specifically configured to: determine a Doppler phase difference based on the phase of the first beam and the phase of the second beam, and determine the information about the first target based on the Doppler phase difference.

In a possible design, the at least one second signal corresponds to a second transmit antenna, and when determining the Doppler phase difference based on the phase of the first beam and the phase of the second beam, the processing unit is specifically configured to: determine a first phase difference based on the phase of the first beam and the phase of the second beam; determine a second phase difference based on a phase of the first transmit antenna and a phase of the second transmit antenna; and determine the Doppler phase difference based on the first phase difference and the second phase difference.

In a possible design, the at least one first signal corresponds to a first virtual subarray, and the at least one second signal corresponds to a second virtual subarray.

In a possible design, the at least one second signal corresponds to the first transmit antenna, and when determining the Doppler phase difference based on the phase of the first beam and the phase of the second beam, the processing unit is specifically configured to:

- determine a first phase difference based on the phase of the first beam and the phase of the second beam, and determine the Doppler phase difference based on the first phase difference.

In a possible design, the at least one first signal and the at least one second signal correspond to a first virtual subarray.

In a possible design, a first pointing angle of the first beam and a second pointing angle of the second beam indicate the first target, and/or an angle difference between the first pointing angle of the first beam and the second pointing angle of the second beam is less than or equal to a first threshold, and/or a difference between energy of the first beam and energy of the second beam is less than or equal to a second threshold.

In a possible design, the information about the first target includes at least one of an angle, a velocity, or a distance of the first target.

In a possible design, the first time difference is a time difference between different time division multiplexing TDM groups.

According to a third aspect, an apparatus is provided. The apparatus includes a processor, configured to implement the method described in the first aspect. The apparatus may further include a memory, configured to store instructions and data. The memory is coupled to the processor, and the processor executes the program instructions stored in the memory to implement the method described in the first aspect. The apparatus may further include a communications interface. The communications interface is used by the apparatus to communicate with another device. For example, the communications interface may be a transceiver, a circuit, a bus, an antenna (especially applied to a radar apparatus), another type of communications interface, or the like. In a possible design, the apparatus includes:

- a memory, configured to store program instructions; and
- a processor, configured to invoke the instructions in the memory, to perform the following: controlling the communications interface to receive at least one first signal corresponding to a first transmit antenna, and performing beamforming processing on the at least one first signal to generate a first beam; and determining information about a first target based on a phase of the first beam and a phase of a second beam, where the second beam corresponds to at least one second signal received by the detection apparatus, and there is a first time difference between the first beam and the second beam.

In a possible design, the second beam is generated after beamforming processing is performed on the at least one second signal.

In a possible design, when determining the information about the first target based on the phase of the first beam and the phase of the second beam, the processor is specifically configured to: determine a Doppler phase difference based on the phase of the first beam and the phase of the second beam, and determine the information about the first target based on the Doppler phase difference.

In a possible design, the at least one second signal corresponds to a second transmit antenna, and when determining the Doppler phase difference based on the phase of the first beam and the phase of the second beam, the processor is specifically configured to: determine a first phase difference based on the phase of the first beam and the phase of the second beam; determine a second phase difference based on a phase of the first transmit antenna and a phase of the second transmit antenna; and determine the Doppler phase difference based on the first phase difference and the second phase difference.

In a possible design, the at least one first signal corresponds to a first virtual subarray, and the at least one second signal corresponds to a second virtual subarray.

In a possible design, the at least one second signal corresponds to the first transmit antenna, and when determining the Doppler phase difference based on the phase of the first beam and the phase of the second beam, the processor is specifically configured to: determine a first phase difference based on the phase of the first beam and the phase of the second beam, and determine the Doppler phase difference based on the first phase difference.

In a possible design, the at least one first signal and the at least one second signal correspond to a first virtual subarray.

In a possible design, a first pointing angle of the first beam and a second pointing angle of the second beam indicate the first target, and/or an angle difference between the first pointing angle of the first beam and the second pointing angle of the second beam is less than or equal to a first threshold, and/or a difference between energy of the first beam and energy of the second beam is less than or equal to a second threshold.

In a possible design, the information about the first target includes at least one of an angle, a velocity, or a distance of the first target.

In a possible design, the first time difference is a time difference between different time division multiplexing TDM groups.

According to a fourth aspect, a computer readable storage medium is provided, including instructions, and when the instructions are run on a computer, the computer is enabled to perform the method according to the first aspect.

According to a fifth aspect, a chip system is provided. The chip system includes at least one processor, and may further include at least one memory. The at least one processor executes programs or instructions stored in the at least one memory to implement the method according to any design of the foregoing first aspect. The chip system may include a chip or an integrated circuit, or may include a chip or an integrated circuit and another discrete device.

According to a sixth aspect, a computer program product is provided, including instructions, and when the instructions are run on a computer, the computer is enabled to perform the method according to the first aspect.

According to a seventh aspect, a sensor is provided, including the apparatus according to the second aspect or the third aspect.

According to an eighth aspect, a sensor system is provided, including at least one sensor, and the sensor may include the apparatus according to the second aspect or the third aspect.

According to a ninth aspect, a vehicle is provided, including at least one sensor, and the sensor may include the apparatus according to the second aspect or the third aspect.

BRIEF DESCRIPTION OF DRAWINGS

FIG. 7 is a schematic diagram of a TDM waveform according to an embodiment of this application;

FIG. 8 is a schematic diagram of a virtual array according to an embodiment of this application;

DESCRIPTION OF EMBODIMENTS

Figure 1:
FIG. 1 is a schematic diagram of a virtual array according to an embodiment of this application.

The following explains and describes some nouns or terms used in embodiments of this application, and the nouns or terms also serves as a part of content of the present invention.

1. Detection Apparatus

A detection apparatus is an apparatus used to detect a target object. For example, the detection apparatus may be used to detect at least one of a velocity, an angle, a distance, or other information of a target object, and the velocity, angle, distance, or other information of the target object detected by the detection apparatus may be absolute information of the target object, or may be relative information of the target object relative to the detection apparatus, or the like, which is not limited. The detection apparatus may be installed on a mobile device, for example, the detection apparatus may be installed on a vehicle as a vehicle-mounted radar detection apparatus. Alternatively, the detection apparatus may be installed on a fixed device, for example, the detection apparatus may be installed on a device such as a road side unit (RSU).

The detection apparatus may include a radar and the like. Radars may be classified into millimeter wave radars, microwave radars, over-the-horizon radars, laser radars, and the like according to frequency bands; or classified into mechanically scanned radars, phased array radars, and the like according to antenna scanning modes; or classified into coherent accumulation radars, non-coherent accumulation radars, moving target indication radars, moving target detection radars, pulse-Doppler radars, synthetic-aperture radars, and track while scan radars according to radar technologies and signal processing modes; or classified into height finder radars, two-coordinate radars, three-coordinate radars, identification friend or foe radars, multi-terminal radars, and the like according to target measurement parameter classification; or classified into monopulse radars, conical scan radars, and hidden conical scan radars according to angle tracking modes; or classified into pulse radars, continuous-wave radars, pulse compression radars, frequency agile radars, and the like according to radar signal forms.

In embodiments of this application, an apparatus configured to implement a detection apparatus function may be a radar, or may be an apparatus capable of supporting a detection apparatus to implement the function, such as a chip system, and the apparatus may be installed in a radar. In another possible implementation, the detection apparatus may alternatively be independent of a radar, for example, may be disposed independently, or integrated in a vehicle-mounted central controller or fusion unit, or another possible processing unit. In embodiments of this application, the chip system may include a chip, or may include a chip and another discrete component. In technical solutions provided in embodiments of this application, the technical solutions provided in the embodiments of this application are described by using an example in which the apparatus configured to implement the detection apparatus function is a radar.

2. Beam

A beam may be understood as a spatial resource, and may be a transmit or receive precoding vector having energy transmission directivity. In addition, the transmit or receive precoding vector can be identified by using index information. The energy transmission directivity may mean that energy of a sent signal is aggregated in a spatial position by precoding processing, and there is relatively large received power for the received signal obtained after the precoding processing by using the precoding vector, for example, meeting a receive demodulation signal-to-noise ratio. The energy transmission directivity may also mean that same signals sent from different spatial positions are received by using the precoding vector, where the same signals have different receive power. Optionally, a same communications device may have different precoding vectors, and different devices may also have different precoding vectors, that is, correspond to different beams. For a configuration or a capability of a communications device, one communications device may use one or more of a plurality of different precoding vectors at a same moment, that is, may form one or more beams at the same time. Beam information may be identified by index information. Optionally, the index information may be index information that is explicitly or implicitly carried in a signal or channel carried by a beam, for example, the index information includes but is not limited to: index information indicating a beam by using a synchronization signal or broadcast channel sent through the beam. A beam pair may include a transmit beam (Tx beam) at a transmit end and a receive beam (Rx beam) at a receive end.

3. Beamforming

Beamforming is used for directional signal transmission or receiving. For signal processing at the receive end, a required desirable signal can be formed by performing weighted summation on signals received by at least one receiving array element. From the perspective from an antenna pattern, this is equivalent to that a beam with a specified direction is formed. For example, an original omnidirectional receive pattern is converted into a zero-point lobe pattern with largest pointing. A similar principle is applicable to the transmit end, where an amplitude and a phase of feeding to an antenna array element are adjusted, to form a pattern of a desired shape. In an optional implementation, the beamforming may be implemented by using Fourier transform. For example, four receiving array elements are used to receive four signals, and Fourier transform may be performed on the four signals to obtain a plurality of beams. For example, if the foregoing Fourier transform is 128-point Fourier transform, 128 beams can be obtained. If the Fourier transform is 256-point Fourier transform, 256 beams can be obtained. From the plurality of beams, a beam with strongest energy is selected, and the beam with the strongest energy may point to a position of the target object, or the like. Optionally, the Fourier transform may be discrete Fourier transform, and an implementation algorithm of the discrete Fourier transform may be fast Fourier transform, such as two-dimensional fast Fourier transform. Alternatively, the beamforming may be implemented by using minimum variance distortionless response (MVDR), adaptive beamforming, or the like, which is not limited.

A beamforming technology is generally applied to a multi-antenna system, such as a multiple-input multiple-output (MIMO) system. Due to the use of a plurality of groups of antennas, wireless signals from the transmit end to the receive end correspond to a same spatial stream and are transmitted through a plurality of paths. At the receive end, a specific algorithm is used to process signals received by the plurality of antennas (or referred to as receiving array elements), which can significantly improve a signal-to-noise ratio of the receive end. Even when the receive end is far away, relatively good signal quality can be obtained.

It should be noted herein that a specific beamforming manner is not limited in this application, and reference may be made to the conventional technology or a proper variation of the conventional technology.

4. Virtual Subarray

In a MIMO radar system, transmit signals transmitted by a plurality of transmit antennas are reflected by the target object to form reflected signals, and receive antennas separate the reflected signals corresponding to the transmit antennas. These reflected signals correspond to combinations of transmit-receive channels. These signals are received and separated by the receive antennas, rather than directly received by the physical antenna, and therefore these signals are referred to as virtual signals. Virtual signals corresponding to the transmit-receive channels are arranged based on transmit and receive antennas to form a virtual subarray, and a single signal is a virtual array element. Optionally, transmit signals transmitted by the plurality of transmit antennas may be mutually orthogonal. Correspondingly, the receive antennas can separate, through signal orthogonality, the reflected signals corresponding to the transmit antennas.

The virtual subarray may also be referred to as a receiving subarray, an antenna subarray, or the like. The virtual subarray may include one or more virtual array elements, and the virtual array element may also be referred to as a receiving array element, an antenna array element, or the like. In a MIMO radar system, the transmit antenna transmits signals in a time division manner, which are reflected by the target object to form reflected signals, and the receive antenna can receive the reflected signals. For a signal transmitted by one transmit antenna, at the receive end, a plurality of receive antennas receive reflected signals corresponding to the signal, and the plurality of receive antennas may form a virtual subarray.

As shown in FIG. 1, it is assumed that a transmit antenna array of the detection apparatus includes a transmit antenna T1, a transmit antenna T2, and a transmit antenna T3, and the three transmit antennas transmit signals in a time-division multiplexing (TDM) manner. A receive antenna array of the detection apparatus includes a receive antenna R1, a receive antenna R2, a receive antenna R3, and a receive antenna R4.

When the transmit antenna T1 of the detection apparatus transmits a signal, the signal reaches the target object and is reflected by the target object to form a reflected signal. The receive antenna R1, the receive antenna R2, the receive antenna R3, and the receive antenna R4 of the detection apparatus all can receive the reflected signal. In this case, the receive antenna R1, the receive antenna R2, the receive antenna R3, and the receive antenna R4 may form a virtual subarray. Refer to FIG. 1. The virtual subarray may include a virtual array element 1, a virtual array element 2, a virtual array element 3, and a virtual array element 4. Similarly, when the transmit antenna T2 of the detection apparatus transmits a signal, the receive antenna R1, the receive antenna R2, the receive antenna R3, and the receive antenna R4 of the detection apparatus may form another virtual subarray. Refer to FIG. 1. In this case, the virtual subarray may include a virtual array element 5, a virtual array element 6, a virtual array element 7, and a virtual array element 8. When the transmit antenna T3 of the detection apparatus transmits a signal, the receive antenna R1, the receive antenna R2, the receive antenna R3, and the receive antenna R4 of the detection apparatus may form another virtual subarray. Refer to FIG. 1. In this case, the virtual subarray may include a virtual array element 9, a virtual array element 10, a virtual array element 11, and a virtual array element 12.

5. Time Division Multiplexing (TDM) Group

In a MIMO system, a detection apparatus (such as a radar) includes a plurality of transmit antennas, the plurality of transmit antennas may be divided into N TDM groups, and different TDM groups use transmitting in a time division manner. N is an integer greater than or equal to 1. For example, the plurality of transmit antennas of the detection apparatus may be randomly divided into N TDM groups. Alternatively, the plurality of transmit antennas may be divided into N TDM groups or the like in sequence based on antenna numbers of the plurality of transmit antennas in the detection apparatus. Still refer to FIG. 1. The detection apparatus includes the transmit antenna T1, the transmit antenna T2, and the transmit antenna T3. The three transmit antennas may be divided into three TDM groups, and each TDM group includes one transmit antenna. Alternatively, the three transmit antennas may be divided into two TDM groups, a TDM group 1 and a TDM group 2. The TDM group 1 may include the transmit antenna 1 and the transmit antenna 2. The TDM group 2 may include the transmit antenna 3. The TDM group 1 and the TDM group 2 use transmitting in a time division manner, and the transmit antenna 1 and the transmit antenna 2 in the TDM group 1 use simultaneous signal transmitting. Different TDM groups may include a same transmit antenna or different transmit antennas. This is not limited. For example, two different TDM groups may include a same transmit antenna, that is, the same transmit antenna repeatedly transmits signals in different TDM groups. It should be noted herein that settings or division of the foregoing TDM groups may be made during factory setting of the radar (or initial design of the radar), or may be made in an application, or may be made based on a type of the radar. Specific manners of the settings are not limited.

Figure 2:
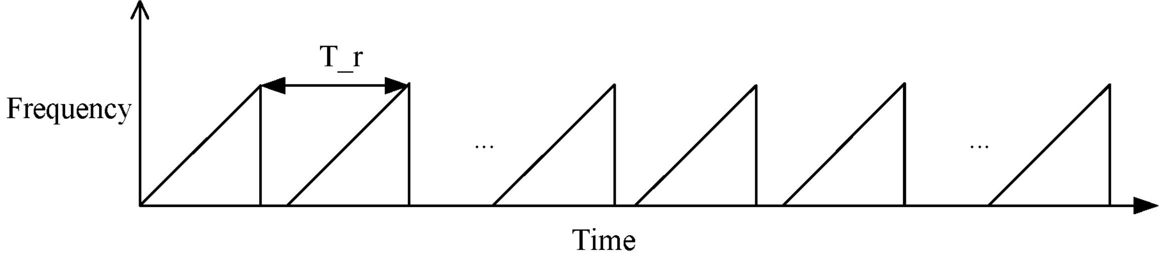
FIG. 2 is a schematic diagram of a TDM waveform according to an embodiment of this application.

In the MIMO system, the detection apparatus uses a frequency modulated continuous wave (FMCW), and a signal transmitted by the transmit antenna of the detection apparatus is referred to as a chirp signal. As shown in FIG. 2, a period of the chirp signal is Tr, or a time interval of the chirp signal is Tr. The detection apparatus may allocate different chirp signals to transmit antennas in different TDM groups, and at least one of bandwidths, frequencies, or periods of different chirp signals is the same or different. For example, the TDM group 1 includes the transmit antenna 1, and the TDM group 2 includes transmit antenna 2. The TDM group 1 and the TDM group 2 transmit signals in a time division manner. The TDM group 1 transmits a signal in a first time period, the TDM group 2 transmits a signal in a second time period, and the first time period is different from the second time period. In this case, the transmit antenna 1 in the TDM group 1 can transmit, in the first time period, a chirp signal 1 corresponding to the first time period. The transmit antenna 2 in the TDM group 2 can transmit, in the second time period, a chirp signal 2 corresponding to the second time period. It should be further noted that, for a case in which a same TDM group includes a plurality of transmit antennas, the plurality of transmit antennas in the TDM group all send a chirp signal corresponding to a time period of the TDM group. For example, the foregoing example is still used. The TDM group 2 corresponds to the chirp signal 2. If the TDM group 2 includes the transmit antenna 3 and a transmit antenna 4, both the transmit antenna 3 and the transmit antenna 4 transmit the chirp signal 2 in the second time period.

6. Beam Pointing Angle

In different scenarios, a definition of a beam pointing angle may vary, which is not specifically limited in embodiments of this application. For example, the beam pointing angle generally means an angle at which energy decreases outward from an axis at an extension of a central axis of a sensor by a half. The beam pointing angle may also be referred to as a beam direction angle, a beam angle, or the like. In the following embodiments, the beam pointing angle is used as an example for description.

7. Doppler Phase Difference

A theory of a Doppler effect is that a wavelength radiated by an object changes because of relative motion of a source and an observer. A difference between transmit and receive frequencies caused by the Doppler effect is referred to as a Doppler frequency shift. The Doppler frequency shift reveals a law of a change of a wave property during motion. Specifically, if a target moves, an echo signal of the radar produces a Doppler frequency shift phenomenon. The Doppler phase difference is generally a phase difference generated by a Doppler frequency shift caused due to movement of the target.

8. Spatial Phase Difference Between Two Transmit Antennas

Due to different spatial positions of two transmit antennas, signals transmitted by the two transmit antennas arrive at a same target at different times, causing a spatial phase difference between the two transmit antennas. Alternatively, it may be described as: because the signals of the two transmit antennas reach the same target at different times, a time difference is generated, and the time difference causes a spatial phase difference between the two transmit antennas.

9. Velocity Ambiguity

The mentioned velocity ambiguity means a phenomenon that when a moving velocity of the target object exceeds a range of a detection velocity of the detection apparatus, a velocity detected by the detection apparatus is incorrect. For example, a range of a detection velocity of the detection apparatus is [−6, 6] km/h. If an actual moving velocity of a moving target relative to the detection apparatus is 8 km/h, however, because 8 km/h is beyond the detection range of the detection apparatus, a moving velocity of the target object relative to the detection apparatus and detected by the detection apparatus is possibly 2 km/h.

In a MIMO radar system, it is assumed that M transmit antennas are included, and the M transmit antennas can transmit signals in a time division multiplexing (TDM) manner. Although a MIMO radar can improve angular resolution, a maximum velocity range corresponding to the MIMO radar is reduced to 1/M of that of a single-input multiple-output (SIMO) radar in a same transmit period, making it easier to cause velocity aliasing during calculation of a velocity of the target object, thereby leading to velocity ambiguity.

Velocity ambiguity may also mean that when a true velocity is $|v|>v_{max}$, a Doppler phase difference is $|2\pi f_d T_r \cdot N|>\pi$, and phase ambiguity appears, thereby leading to a phenomenon of velocity ambiguity. The foregoing $v_{max}$ is a maximum velocity at which the detection apparatus can detect the target object. For example, if the detection apparatus can detect only a target object with a maximum velocity of 20 km/h, a value of $v_{max}$ is 20 km/h. The foregoing $f_d$ represents a Doppler frequency shift. $T_r$ represents a transmit period of a chirp signal or represents a time interval of adjacent chirp signals. N represents a quantity of TDM groups of transmit antennas in the detection apparatus.

Further, it should be noted that in description of embodiments of this application, terms such as “first” and “second” (for example, “first signal”, “second signal”, “first beam”, and “second beam”) are merely used for the purpose of distinguishable descriptions, and shall not be construed as indicating or implying relative importance or construed as indicating or implying a sequence. “and/or” describes an association relationship of associated objects, and indicates that there may be three relationships. For example, A and/or B may indicate that only A exists alone, both A and B exist, or only B exists, where each of A and B may be one or more. At least one of a, b, and c may represent a, or b, or a and b, or a and c, or b and c, or a, b and c. Each of a, b, and c may be one or more. “At least one” may mean one or more.

Figures 3, 4:
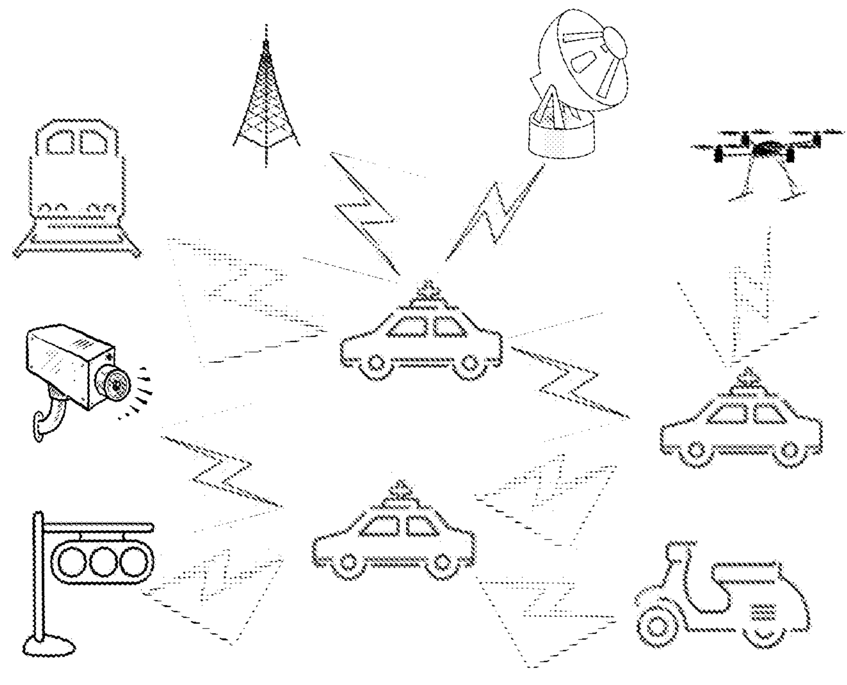
FIG. 3 is a schematic diagram of an application scenario according to an embodiment of this application.
FIG. 4 is a schematic flowchart of signal processing according to an embodiment of this application.

FIG. 3 is a schematic diagram of a possible application scenario according to an embodiment of this application. The application scenario may be unmanned driving, autonomous driving, assisted driving, intelligent driving, networked driving, or the like. A detection apparatus in this embodiment of this application may be installed in a motor vehicle (such as an unmanned vehicle, a smart vehicle, an electric vehicle, or a digital vehicle), an unmanned aerial vehicle, a rail machine, a bicycle, a signal light, a velocity measurement apparatus, a network device (such as a base station or a terminal device in various systems), or the like. Moreover, in addition to the detection apparatus, a processing apparatus, a communications apparatus, and the like may be further installed on the apparatus. In this embodiment of this application, a detection apparatus applicable between vehicles is also applicable between a vehicle and another apparatus such as an unmanned aerial vehicle, or between other apparatus. In addition, the detection apparatus, the processing apparatus, and the communications apparatus may be installed on a mobile device. For example, the detection apparatus is installed on a vehicle as a vehicle-mounted radar, or the detection apparatus, the processing apparatus, and the communications apparatus may be installed on a fixed device, for example, installed on a device such as a road side unit (RSU).

It can be understood that the application scenario is merely used for example description, and is not intended to limit embodiments of this application. For example, in addition to the foregoing application scenarios, the methods and apparatuses provided in embodiments of this application may also be applied to other application scenarios, which are not limited.

The detection apparatus shown in FIG. 3 may include a millimeter wave radar, and the following uses a millimeter wave radar as an example to describe a working principle of a detection apparatus, and a problem in a current solution of the detection apparatus.

A millimeter wave radar, with all-weather, all-day, and low-cost characteristics and the like, has become one of important sensors in the field of safe driving of vehicles. As shown in FIG. 2, the millimeter wave radar usually uses an FMCW waveform. The FMCW waveform can achieve a large bandwidth and a long coherent accumulation time, and therefore has high ranging, velocity measurement accuracy, and resolution. In addition, the millimeter wave radar uses a multiple-input multiple-output (MIMO) technology to achieve high measurement accuracy and high resolution of angles. The foregoing technology enables the millimeter wave radar to have high-resolution imaging and a high-precision positioning capability, thereby reducing a performance gap with an expensive laser detector.

For the MIMO millimeter wave radar, although angular resolution can be improved, a maximum velocity measurement range corresponding to the MIMO radar is reduced to 1/M of a SIMO radar in a same transmission period (M is a quantity of transmit antennas in MIMO, and the foregoing M transmit antennas can transmit signals in a TDM manner), thereby leading to velocity ambiguity.

The mentioned velocity ambiguity means a phenomenon that when a moving velocity of a target object exceeds a range of a detection velocity of the detection apparatus, a velocity detected by the detection apparatus is incorrect. For example, a range of a detection velocity of the detection apparatus is [−6, 6] km/h. If an actual moving velocity of a moving target relative to the detection apparatus is 8 km/h, however, because 8 km/h is beyond the detection range of the detection apparatus, a moving velocity of the target object relative to the detection apparatus and detected by the detection apparatus is possibly 2 km/h.

In order to resolve the foregoing velocity ambiguity problem, in a solution, during design of an antenna array of the detection apparatus, virtual subarrays corresponding to two different groups of transmit antennas are enabled to have overlapping array elements. A phase difference of overlapping virtual subarrays is caused only by a Doppler phase difference. Therefore, the Doppler phase difference can be determined by measuring the phase difference of the overlapping virtual subarrays. Velocity ambiguity can be resolved based on the Doppler phase difference. However, in the foregoing manner of designing overlapping virtual subarrays, there are the following problems: reduction of an array aperture, inconvenience for system design, and vulnerability to impact by an array error.

During design of this application, the detection apparatus may separately perform beamforming on at least one first signal and at least one second signal, to obtain a first beam and a second beam. A Doppler phase difference can be determined based on the first beam, the second beam, and phases of the two beams, so that velocity ambiguity can be resolved. It can be learned that in the foregoing design, there is no need to dispose virtual subarrays of the detection apparatus in an overlapping manner. Therefore, this can resolve the foregoing problems caused by the foregoing overlapping virtual subarrays, such as reduction of an array aperture, inconvenience for system design, and vulnerability to impact by an array error.

To resolve the foregoing problems, a signal processing method and an apparatus are proposed. A principle of the method is as follows: The detection apparatus may separately perform beamforming on at least one first signal and at least one second signal, to obtain a first beam and a second beam. A Doppler phase difference can be determined based on the first beam, the second beam, and phases of the two beams, so that velocity ambiguity can be resolved. It can be learned that in the foregoing signal processing method, there is no need to dispose virtual subarrays of the detection apparatus in an overlapping manner. Therefore, this can resolve the foregoing problems caused by the foregoing overlapping virtual subarrays, such as reduction of an array aperture, inconvenience for system design, and vulnerability to impact by an array error.

As shown in FIG. 4, a procedure of a signal processing method is provided. The procedure is performed by a detection apparatus, and the detection apparatus may be applied to the scenario shown in FIG. 3. The detection apparatus may be a radar (or referred to as a radar apparatus), or the detection apparatus may be a chip installed in a detection device, and the detection device may be a radar (or referred to as a radar apparatus), another device, or the like. The procedure includes the following steps.

S400: The detection apparatus receives at least one first signal corresponding to a first transmit antenna. Optionally, the at least one first signal may include at least two first signals.

S401: The detection apparatus performs beamforming processing on at least one first signal to generate a first beam.

In an optional design, that the detection apparatus performs beamforming processing on at least one first signal to generate a first beam includes: the detection apparatus performs Fourier transform on the at least one signal to obtain a plurality of beams. The first beam belongs to the plurality of beams. Optionally, the first beam is a beam with strongest energy in the plurality of beams.

For example, if the foregoing Fourier transform is 128-point Fourier transform, 128 beams can be obtained. If the foregoing Fourier transform is 256-point Fourier transform, 256 beams can be obtained. Optionally, the detection apparatus may determine the first beam in the plurality of beams. For example, the detection apparatus may select a beam with strongest energy from the plurality of beams as the first beam. The first beam points to a position of a first target. Alternatively, the beamforming may be implemented by using minimum variance distortionless response (MVDR), adaptive beamforming, or the like, which is not limited. For example, the detection apparatus may transmit a signal through the first transmit antenna, and the signal reaches the first target object and is reflected by the first target object to form a reflected signal. The first transmit antenna may correspond to a first virtual subarray, and the first virtual subarray includes one or more virtual array elements. For a correspondence between a transmit antenna and the first virtual subarray, refer to the description of the foregoing "virtual subarray". The virtual array element corresponding to the first virtual subarray of the detection apparatus can separately receive the reflected signal. Beamforming is performed on the reflected signal to generate the first beam. The first beam may point to the position of the first target object. The "at least one first signal" in the foregoing S400 and S401 may be specifically a signal reflected by the first target object, and a quantity of the "at least one first signal" is one or more, and the specific quantity is related to a quantity of virtual array elements in the first virtual subarray. For example, if the first virtual subarray includes four virtual array elements, the virtual array elements respectively may receive four signals, and the "at least one first signal" may include 4 signals. Similarly, in the foregoing S401, beamforming processing may be performed on the four signals to generate a first beam, and the first beam points to the position of the first target object.

Optionally, beamforming may be implemented in a Fourier transform manner. For example, if the first transmit antenna corresponds to the first virtual subarray, and the first virtual subarray includes four virtual array elements, the detection apparatus may receive four signals by using the four virtual array elements. The detection apparatus may perform Fourier transform on the four signals to obtain a plurality of beams. For example, 128-point Fourier transform is performed on the four signals to obtain 128 beams. The detection apparatus may select a beam whose energy meets a condition (for example, a beam with strongest energy) from the plurality of beams as the first beam.

S402: The detection apparatus determines information about the first target based on a phase of the first beam and a phase of a second beam.

For example, the detection apparatus may determine a Doppler phase difference based on the phase of the first beam and the phase of the second beam. The detection apparatus may determine the information about the first target based on the Doppler phase difference, where the information about the first target may include at least one of a velocity, an angle, a distance, or other information of the first target. For example, in a possible implementation, the detection apparatus may determine a velocity ambiguity coefficient based on the Doppler phase difference, and may determine the information about the first target based on the velocity ambiguity coefficient. How to determine the velocity ambiguity coefficient based on the Doppler phase difference and how to determine information about the first target based on the velocity ambiguity system are subsequently described in detail in the following embodiments. It should be noted herein that the Doppler phase difference may be an intermediate variable or parameter, and there is no need to separately determine the Doppler phase difference, provided that the information about the first target is finally determined.

Optionally, in the foregoing procedure shown in FIG. 4, the second beam may correspond to at least one second signal received by the detection apparatus, there may be a first time difference between the first beam and the second beam, and the first time difference may be a time difference between different TDM groups. For example, in Example 1 below, the detection apparatus includes N TDM groups, and the N TDM groups use transmitting in a time division manner. It is assumed that the N TDM groups include an $L^{th}$ TDM group and a $K^{th}$ TDM group, L and K are both integers greater than or equal to 1 and less than or equal to N, the $L^{th}$ TDM group includes the first transmit antenna, and the $K^{th}$ TDM group includes the second transmit antenna. The first transmit antenna of the detection apparatus transmits the first signal in a time period corresponding to the $L^{th}$ TDM group. The second transmit antenna of the detection apparatus transmits the second signal in a time period corresponding to the $K^{th}$ TDM group. The first time difference may be a time difference between the $L^{th}$ TDM group and the $K^{th}$ TDM group. Alternatively, in Example 2 below, it is assumed that the N TDM groups of the detection apparatus include an $M^{th}$ TDM group and a $P^{th}$ TDM group, and M and P are integers greater than or equal to 1 and less than or equal to N. It is assumed that the $M^{th}$ TDM group includes the first transmit antenna, and the first transmit antenna of the detection apparatus transmits the first signal in a time period corresponding to the $M^{th}$ TDM group. The $P^{th}$ TDM group also includes the first transmit antenna, and the first transmit antenna of the detection apparatus transmits the second signal in a time period corresponding to the $P^{th}$ TDM group. The first time difference may be a time difference between the $M^{th}$ TDM group and the $P^{th}$ TDM group.

Optionally, the second beam is generated after beamforming processing is performed on the at least one second signal. The first beam and the second beam may point to a position of a same target, for example, the same target may be the first target. In this embodiment of this application, implementation may be achieved in but is not limited to any one of the following manners:

1. A first pointing angle of the first beam and a second pointing angle of the second beam point to the position of the first target. For example, the first pointing angle of the first beam is 90 degrees, the second pointing angle of the second beam is also 90 degrees, and the first target is at a position obtained by shifting 90 degrees relative to the detection apparatus.
2. An angle difference between a first pointing angle of the first beam and a second pointing angle of the second beam is less than or equal to a first threshold. A value of the first threshold may be predefined or preconfigured, or may be an empirical value in the field. In this manner, when the pointing angles of the two beams are different, but the angle difference between the two beams is relatively small, it may also be considered that the two beams point to a position of a same target. For example, it is assumed that the first threshold is 5 degrees, the pointing angle of the first beam is 90 degrees, and the pointing angle of the second beam is 91 degrees. The angle difference between the two pointing angles is 1 degree, which is less than the first threshold. It may be considered that the first beam and the second beam also point to a position of a same target.
3. An angle difference between a first pointing angle of the first beam and a second pointing angle of the second beam is less than or equal to a first threshold, and a difference between energy of the first beam and energy of the second beam is less than or equal to a second threshold, and so on. In this manner, the angle difference between the two beams is constrained, and further, the energy difference between the two beams is constrained. It may be considered that the two beams point to a same target only when the two conditions are both met.

It can be learned from the foregoing description that in this embodiment of this application, the detection apparatus may determine the Doppler phase difference based on the phase of the first beam and the phase of the second beam, and determine the information about the first target based on the Doppler phase difference. Therefore, impact of Doppler frequency shift on detection of the first target can be mitigated, so that the information, such as the velocity, distance, or angle, about the first target detected by the detection apparatus is more accurate.

Example 1: The detection apparatus in the procedure shown in FIG. 4 may include a first transmit antenna. The detection apparatus transmits a first signal by using the first transmit antenna, where the first signal reaches a target object and is reflected by the target object to form a reflected signal; and receives, by using a first virtual subarray, the reflected signal corresponding to the first signal. Similarly, the detection apparatus further includes a second transmit antenna. The detection apparatus transmits a second signal by using the second transmit antenna, where the second signal reaches the target object and is reflected by the target object to form a reflected signal; and receives, by using a second virtual subarray, the reflected signal corresponding to the second signal.

The detection apparatus may perform beamforming on the signal received by the first virtual subarray to generate a first beam, and perform beamforming on the signal received by the second virtual subarray to generate a second beam. The first beam and the second beam point to a same target object, namely, the first target in the procedure shown in FIG. 4. For example, if the first virtual subarray includes four virtual array elements, four signals may be received by using the four virtual array elements. The detection apparatus may perform Fourier transform on the four signals to obtain a plurality of beams. For example, 128-point Fourier transform is performed on the four signals to obtain 128 beams. The detection apparatus may select a beam with strongest energy from the plurality of beams as the first beam. Similarly, if the second virtual subarray includes four virtual array elements, the four virtual array elements may receive four signals. The detection apparatus may perform Fourier transform on the four signals to obtain a plurality of beams. The detection apparatus may select a beam with strongest energy from the plurality of beams as the second beam.

The detection apparatus determines a first spatial phase difference between the first beam and the second beam, and a second spatial phase difference between the first transmit antenna and the second transmit antenna. The Doppler phase difference can be determined based on the first spatial phase difference and the second spatial phase difference, and then the detection apparatus may determine the information, such as the velocity, the angle, or the distance, about the target object based on the Doppler phase difference. How the detection apparatus determines the information, such as the velocity, the angle, or the distance, about the target object based on the Doppler phase difference is subsequently described in detail in the following embodiments. It should be noted herein that at least one of the first spatial phase difference, the second spatial phase difference, or the Doppler phase difference may also be an intermediate variable or parameter, and there is no need to separately determine at least one of the spatial phase differences or the Doppler phase difference, provided that the information about the target object is finally determined.

It should be noted that, in the following description, "spatial phase difference" and "phase difference" are not distinguished, "spatial phase difference" may be denoted as "phase difference", or "phase difference" may also be denoted as "spatial phase difference" or the like.

A specific implementation of the foregoing S402 may be: the detection apparatus may determine the phase difference between the first beam and the second beam, where for ease of description, the phase difference between the first beam and the second beam may be denoted as a first phase difference; and further, the detection apparatus may determine the spatial phase difference between the first transmit antenna and the second transmit antenna. For ease of description, the spatial phase difference between the first transmit antenna and the second transmit antenna may be denoted as a second phase difference. The detection apparatus may determine the Doppler phase difference based on the first phase difference and the second phase difference. For example, the Doppler phase difference may be specifically a difference between the first phase difference and the second phase difference. For example, if the first phase difference is 50 degrees and the second phase difference is 30 degrees, the Doppler phase difference may be a difference between the two phase differences, such as 20 degrees.

Optionally, in the foregoing procedure shown in FIG. 4, the following description may also be used: at least one first signal may correspond to the first transmit antenna, and at least one second signal may correspond to the second transmit antenna. Alternatively, this may be described as: at least one first signal corresponds to the first virtual subarray, and at least one second signal corresponds to the second virtual subarray. The first transmit antenna corresponds to the first virtual subarray, and the second transmit antenna corresponds to the second virtual subarray.

For example, it is assumed that a transmit antenna array of the detection apparatus includes a first transmit antenna and a second transmit antenna, and the first transmit antenna and the second transmit antenna transmit signals respectively in an $L^{th}$ TDM group and a $k^{th}$ TDM group in a time division manner. The first transmit antenna corresponds to the first virtual subarray, and the second transmit antenna corresponds to the second virtual subarray. Beamforming is performed on a signal received by the first virtual subarray to generate a first beam, and beamforming is performed on a signal received by the second virtual subarray to generate a second beam. When the first beam and the second beam point to a same target, namely, the first target in the foregoing embodiment shown in FIG. 4, a phase difference $\phi$ between the first beam and the second beam is calculated. Then a spatial phase difference $\phi_s$ between the first transmit antenna and the second transmit antenna is estimated based on pointing angles of the first beam and the second beam. For example, the spatial phase difference $\phi_s$ between the first transmit antenna and the second transmit antenna may meet the following condition:

$$\phi_s = 2\pi\frac{d_{Tx}\sin\hat{\theta}}{\lambda}$$

$\phi_s$ represents the spatial phase difference between the first transmit antenna and the second transmit antenna. $\hat{\theta}$ represents the pointing angle of the first beam and the second beam (for example, if values of the pointing angles of the first beam and the second beam have a specific shift, either value or an average value of the two pointing angles can be used herein). $\lambda$ represents a wavelength. $d_{Tx}$ represents a physical distance between the first transmit antenna and the second transmit antenna. For example, in the detection apparatus, if a distance between the first transmit antenna and the second transmit antenna is 2 centimeters, a value of $d_{Tx}$ is 2 centimeters.

Finally, the detection apparatus may determine the Doppler phase difference. For example, the Doppler phase difference may meet the following condition:

$$\phi_d = \phi - \phi_s$$

$\phi_d$ represents the Doppler phase difference. $\phi$ represents the phase difference between the first beam and the second beam. $\phi_s$ represents the spatial phase difference between the first transmit antenna and the second transmit antenna.

Figures 5, 6:
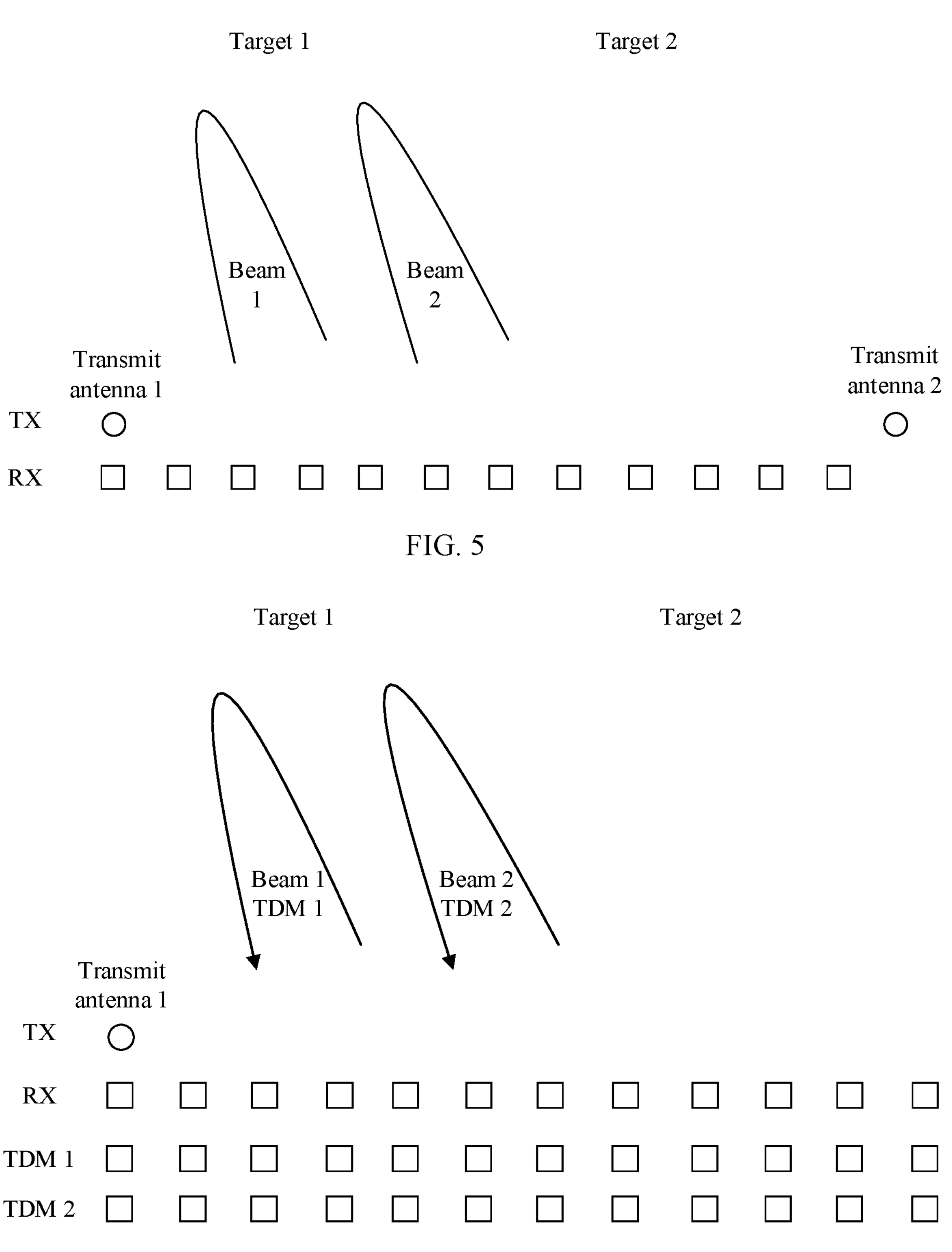
FIG. 5 is a schematic diagram of beams of receiving subarrays transmitted by different transmit antennas according to an embodiment of this application.
FIG. 6 is a schematic diagram of beams of receiving subarrays repeatedly transmitted by a same transmit antenna according to an embodiment of this application.

For another example, refer to FIG. 5. The procedure shown in FIG. 4 is described by using an example in which in the procedure shown in FIG. 4, the first transmit antenna is a transmit antenna 1, the second transmit antenna is a transmit antenna 2, the first beam is a beam 1, the second beam is a beam 2, the first target is a target 1, and the virtual subarray is a receiving subarray.

As shown in FIG. 5, the detection apparatus performs beamforming on a signal received by a receiving subarray corresponding to the transmit antenna 1, to generate the beam 1, and the beam 1 points to the target 1. The detection apparatus performs beamforming on a signal received by receiving subarray corresponding to the transmit antenna 2, to generate the beam 2, and the beam 2 points to the target 1. Optionally, the beamforming may be implemented by using fast Fourier transform (FFT).

Further, after beamforming is separately performed on the signals received by the receiving subarrays corresponding to the transmit antenna 1 and transmit antenna 2, at the target 1, a phase difference $\phi$ between the beam 1 and the beam 2 may be a sum of a Doppler phase difference $\phi_d$ caused by movement of the target 1 and a spatial phase difference $\phi_s$ caused by the transmit antenna 1 and the transmit antenna 2, which is as follows:

$$\phi = \phi_d + \phi_s$$

$\phi$ represents the phase difference between the first beam and the second beam. $\phi_d$ represents the Doppler phase difference. $\phi_s$ represents the spatial phase difference between the first transmit antenna and the second transmit antenna.

The spatial phase difference $\phi_s$ between the transmit antenna 1 and the transmit antenna 2 may be estimated based on pointing angles of the beam 1 and the beam 2 as follows:

$$\phi_s = 2\pi\frac{d_{Tx}\sin\hat{\theta}}{\lambda},$$

so that the Doppler phase difference $\phi_d = \phi - \phi_s$ caused by movement of the target 1 can be obtained through calculation.

Example 2: The detection apparatus in the procedure shown in FIG. 4 may include a first transmit antenna. The detection apparatus may transmit a first signal and a second signal in a time division manner by using the first transmit antenna, where the first signal reaches a target object and is reflected by the target object to form a reflected signal; and receive, by using a first virtual subarray, the reflected signal corresponding to the first signal. In this case, beamforming is performed on the signal received by the first virtual subarray to generate a first beam. Similarly, the second signal may also reach the target object and is reflected by the target object to form a reflected signal, and the reflected signal corresponding to the second signal is received by using the first virtual subarray. In this case, beamforming is performed on the signal received by the first virtual subarray to generate a second beam.

Because the first beam and the second beam correspond to the same transmit antenna (namely, the first transmit antenna), there is no need to compensate a spatial phase difference between two antennas. A first spatial phase difference between the first beam and the second beam is the foregoing Doppler phase difference. For example, if a measured first spatial phase difference between the first beam and the second beam is 50 degrees, the Doppler phase difference is also 50 degrees. In the foregoing Example 1, because the first beam and the second beam correspond to different transmit antennas, the first spatial phase difference between the first beam and the second beam includes the Doppler phase difference and further includes the spatial phase difference between the two transmit antennas. The foregoing example is still used. If a measured first spatial phase difference between the first beam and the second beam is 50 degrees, and the spatial phase difference between the two transmit antennas is 30 degrees, the Doppler phase difference is a difference between the two differences, which is 20 degrees. Alternatively, the foregoing process may also be described as: the detection apparatus determines the first phase difference between the first beam and the second beam. The detection apparatus determines the Doppler phase difference based on the first phase difference, and then the detection apparatus may determine the information, such as the velocity, the angle, and the distance, about the target object based on the Doppler phase difference. How the detection apparatus determines the information, such as the velocity, the angle, or the distance, about the target object is subsequently described in detail in the following embodiments. It should be noted herein that at least one of the first phase difference or the Doppler phase difference may also be an intermediate variable or parameter, and there is no need to separately determine at least one of the first phase differences or the Doppler phase difference, provided that the information about the target object is finally determined.

A specific implementation of the foregoing S402 may be: the detection apparatus may determine the first phase difference between the first beam and the second beam, and the detection apparatus determines the Doppler phase difference based on the first phase difference between the first beam and the second beam. Optionally, in the foregoing procedure shown in FIG. 4, the following description may also be used: at least one first signal may correspond to the first transmit antenna, and at least one second signal may correspond to the first transmit antenna, which may be described as: at least one first signal may correspond to the first virtual subarray, and at least one second signal may correspond to the first virtual subarray. The first transmit antenna corresponds to the first virtual subarray.

For another example, refer to FIG. 6. The procedure shown in FIG. 4 is described by using an example in which in the procedure shown in FIG. 4, the first transmit antenna is a transmit antenna 1, the first beam is a beam 1, the second beam is a beam 2, and the virtual subarray is a receiving subarray.

Considering a possible array error between the transmit antenna 1 and the transmit antenna 2 (for example, the manner in FIG. 5), it can be considered that the transmit antenna 1 repeatedly transmits signals in different TDM groups. In FIG. 6, the transmit antenna 1 transmits signals in an $M^{th}$ TDM group and a $P^{th}$ TDM group in a time division manner. Optionally, the $M^{th}$ TDM group and the $P^{th}$ TDM group may be TDM groups that are adjacent in terms of time. For example, the $M^{th}$ TDM group is a TDM group 1, and the $P^{th}$ TDM group is a TDM group 2. In FIG. 6, an example in which the $M^{th}$ TDM group is the TDM group 1 and the $P^{th}$ TDM group is the TDM group 2 is used for description.

For two groups of received data, beamforming is separately performed twice on signals received by the receiving subarray corresponding to the transmit antenna 1, to form the beam 1 and the beam 2. Because the beam 1 and the beam 2 correspond to the same transmit antenna, they are not affected by an array error. The beam 1 and the beam 2 come from the same transmit antenna, and there is no need to compensate for a spatial phase difference $\phi_s$ caused between the transmit antenna 1 and the transmit antenna 2. In this case, a phase difference $\phi$ between the first beam and the second beam is the Doppler phase difference.

It can be learned from the foregoing description that the detection apparatus may determine the Doppler phase difference by using the method of the procedure shown in FIG. 4. Further, the detection apparatus may resolve velocity ambiguity based on the Doppler phase difference. After velocity ambiguity is resolved, the detection apparatus may determine the information, such as the velocity, the angle, or the distance, about the first target. For ease of understanding, reasons for causing velocity ambiguity are first explained below.

Refer to FIG. 2. When the detection apparatus uses an FMCW waveform, a velocity measurement range of the detection apparatus is determined by an interval time of chirp signals of an antenna, and a maximum velocity measurement range is $[-v_{max}, v_{max}]$. For example, if a velocity measurement range of the detection apparatus is [−200, 200] km/h according to detection requirements of the detection apparatus, a value of $-v_{max}$ is −200 km/h, and a value of $v_{max}$ is 200 km/h.

$$v_{max} = \frac{\lambda}{4T_r}$$

A represents a wavelength of the FMCW signal. $T_r$ represents the time interval of different chirp signals, or represents a period of the chirp signal, or the like.

Refer to FIG. 7. When the transmit antennas are divided into N TDM groups, and different TDM groups use transmitting in a time division manner, a delay of two chirps in a same group becomes N times of an original value, that is, N*Tr. In this case, a maximum velocity range of a TMD FMCW is reduced to 1/N, and a maximum ambiguous velocity is as follows:

$$v_{max} = \frac{\lambda}{4 \cdot N \cdot T_r}$$

$v_{max}$ represents the maximum detection range of the detection apparatus. $T_r$ represents the time interval of different chirp signals, or represents the period of the chirp signal. N represents a quantity of TDM groups of transmit antennas in the detection apparatus. $\lambda$ represents the signal wavelength.

In addition, as shown in FIG. 8, movement of the target and time-division transmitting cause a Doppler phase difference $2\pi f_d T_r(k-1), k=1, \ldots, N$ between a transmit antenna corresponding to a $k^{th}$ TDM group and the transmit antenna in the first TDM group.

$f_d$ represents a Doppler frequency shift. $T_r$ represents the time interval of different chirp signals, or represents the period of the chirp signal. k indicates a transmitting order of TDM groups.

In FIG. 8, a phase difference between adjacent transmit antennas is $$\phi = 2\pi\left(\frac{d_{Tx}\sin\theta}{\lambda} + f_d T_r\right),$$

the phase difference includes both spatial angle information and velocity information, that is, a problem of coupling between an angle and a velocity is caused.

$\theta$ represents an angle of the target object. $\phi$ represents the spatial phase difference between the first transmit antenna and the second transmit antenna. $d_x$ represents a physical distance between the first transmit antenna and the second transmit antenna. $\lambda$ represents the signal wavelength. $f_d$ represents a true Doppler frequency shift. $T_r$ represents the transmit period of the chirp signal, or represents the time interval of adjacent chirp signals.

To resolve the problem of coupling between the velocity and the angle for TDM-MIMO, that is, to eliminate impact of the Doppler frequency shift on angle estimation, the true Doppler frequency shift $$f_d = \frac{2v}{\lambda}$$

needs to be estimated.

$f_d$ represents the true Doppler frequency shift. λ represents the signal wavelength. v represents a velocity of the target object.

A Doppler frequency shift $f_{dumb}$ obtained after 2D-FFT may be ambiguous. A phase ambiguity coefficient is defined as a velocity ambiguity coefficient ξ, that is, $$f_d = f_{damb} + \frac{\xi}{N}\frac{1}{T_r}.$$

$f_d$ represents the true Doppler frequency shift. $f_{damb}$ represents an ambiguous Doppler frequency shift obtained after 2D-FFT. ξ represents a velocity ambiguity coefficient. N represents the quantity of TDM groups of transmit antennas in the detection apparatus. $T_r$ represents the time interval of different chirp signals, or represents the period of the chirp signal. An ambiguous velocity is reduced to 1/N in TDM, that is, $$v_{max} = \frac{\lambda}{4 \cdot N \cdot T_r},$$

and in order to decouple velocity/angle coupling, the ambiguous velocity needs only to be restored to a maximum ambiguous velocity $$v_{max} = \frac{\lambda}{4T_r}$$

of a single chirp. Therefore, there are N possible values for the ambiguous coefficient. In implementation of this application, N=3 is assumed. There are three possible values ξ=[−1 0 1] for ξ, that is, a velocity range corresponding to a single chirp is $v \in [-3v_{max}, 3v_{max}]$. During design, a maximum ambiguous velocity corresponding to a single chirp is usually designed to meet specific system requirements. TDM-MIMO velocity ambiguity resolution is to find a correct one of these three possible values of ξ.

The following embodiments describe in detail how to resolve velocity ambiguity for the foregoing Example 1 and Example 2 and how the detection apparatus determines the information, such as the velocity, the angle, or the distance, about the target object after the velocity ambiguity is resolved.

For the foregoing Example 1, after the detection apparatus determines the Doppler phase difference, the detection apparatus may determine the velocity ambiguity coefficient based on the Doppler phase difference. For example, when the detection apparatus resolves TDM velocity ambiguity, the velocity ambiguity coefficient may meet the following condition:

$$\xi = \arg\min_{\xi}\left|\phi_d - 2\pi\left(f_{damb}T_r + \frac{\xi}{N}\right)(k-l)\right|,\ \xi = 0, \ldots, N-1$$

ξ represents the velocity ambiguity coefficient. $\phi_d$ represents the Doppler phase difference. $f_{damb}$ represents a Doppler frequency shift obtained after 2D-FFT. k represents a TDM group identifier corresponding to the first transmit antenna. l represents a TDM group identifier corresponding to the second transmit antenna. $T_r$ represents the transmit period of the chirp signal, or represents the time interval of adjacent chirp signals. N represents the quantity of TDM groups of transmit antennas in the detection apparatus.

Then, the detection apparatus may determine the Doppler frequency shift based on the velocity ambiguity coefficient. In this case, the Doppler frequency shift is true, and is different from the Doppler frequency shift $f_{damb}$ obtained after the foregoing 2D-FFT. The Doppler frequency shift $f_{damb}$ obtained after 2D-FFT may be ambiguous, or is referred to as inaccurate. For example, the Doppler frequency shift determined by the detection apparatus may meet the following condition:

$$f_d = f_{damb} + \frac{\xi}{N}\frac{1}{T_r}$$

$f_d$ represents the true Doppler frequency shift. $f_{damb}$ represents the ambiguous Doppler frequency shift obtained after 2D-FFT. ξ represents the velocity ambiguity coefficient. N represents the quantity of TDM groups of transmit antennas in the detection apparatus. $T_r$ represents the transmit period of the chirp signal, or represents the time interval of adjacent chirp signals.

Then, the detection apparatus may determine a velocity of the target object based on the foregoing determined true Doppler frequency shift, for example, the velocity of the target object meets the following condition:

$$f_d = \frac{2v}{\lambda}$$

where $f_d$ represents the true Doppler frequency shift, λ represents the wavelength of the chirp signal, and v represents the velocity of the target object; and/or the detection apparatus may further determine an angle of the target object based on the determined true Doppler frequency shift, for example, the angle of the target object meets the following condition:

$$\phi = 2\pi\left(\frac{d_{Tx}\sin\theta}{\lambda} + f_d T_r\right)$$

θ represents the angle of the target object. ϕ represents the spatial phase difference between the first transmit antenna and the second transmit antenna. $d_{Tx}$ represents a physical distance between the first transmit antenna and the second transmit antenna. λ represents the wavelength of the chirp signal. $f_d$ represents the true Doppler frequency shift. $T_r$ represents the transmit period of the chirp signal, or represents the time interval of adjacent chirp signals.

In the foregoing Example 1, because transmit antennas corresponding to the two TDM groups have a spatial phase difference $$\phi_s = 2\pi\frac{d_{Tx}\sin\theta}{\lambda},$$

the Doppler phase difference is $$\phi_d = \phi - \phi_s = 2\pi\left(f_{damb}T_r + \frac{\xi}{N}\right)(k-l) - 2\pi\frac{d_{Tx}\sin\theta}{\lambda}.$$

$\phi$ represents the spatial phase difference between the first beam and the second beam. $\phi_d$ represents the Doppler phase difference. $\phi_s$ represents a phase difference between adjacent transmit antennas. $f_{damb}$ represents the ambiguous Doppler frequency shift obtained after 2D-FFT. $T_r$ represents the transmit period of the chirp signal, or represents the time interval of adjacent chirp signals. $\xi$ represents the velocity ambiguity coefficient. N represents the quantity of TDM groups of transmit antennas in the detection apparatus. k represents a TDM group identifier for transmitting a signal for the first time when the first transmit antenna transmits signals in a time division manner. l represents a TDM group identifier for transmitting a signal for the second time when the first transmit antenna transmits signals in a time division manner. $\theta$ represents the angle of the target object. $d_{Tx}$ represents the physical distance between the first transmit antenna and the second transmit antenna. $\lambda$ represents the wavelength of the chirp signal.

In the foregoing Example 2, in the $M^{th}$ TDM group and the $P^{th}$ TDM group, signals are sent by the same antenna, and the virtual subarray that transmits signals twice is at a same position in terms of space (which is equivalent to that a plurality of overlapping array elements are virtualized, and the virtual subarray 1 overlaps the virtual subarray 2). Therefore, in this case, the phase difference $\phi$ between the beam 1 and the beam 2 includes only the Doppler phase difference $\phi_d$, without including the spatial phase difference, that is, $\phi=\phi_d$. Therefore, in Example 2, the phase difference between the first beam and the second beam is as follows:

$$\phi = \phi_d = 2\pi\left(f_{damb}T_r + \frac{\xi}{N}\right)(m-p)$$

$\phi$ represents the spatial phase difference between the first beam and the second beam. $\phi_d$ represents the Doppler phase difference. $f_{damb}$ represents the ambiguous Doppler frequency shift obtained after 2D-FFT. $T_r$ represents the transmit period of the chirp signal, or represents the time interval of adjacent chirp signals. $\xi$ represents the velocity ambiguity coefficient. N represents the quantity of TDM groups of transmit antennas in the detection apparatus. m represents a TDM group identifier for transmitting a signal for the first time when the first transmit antenna transmits signals in a time division manner. p represents a TDM group identifier for transmitting a signal for the second time when the first transmit antenna transmits signals in a time division manner.

In the foregoing Example 2, the detection apparatus may determine the velocity ambiguity coefficient based on the Doppler phase difference. For example, the velocity ambiguity coefficient may meet the following condition:

$$\xi = \arg\min_{\xi}\left|\phi - 2\pi\left(f_{damb}T_r + \frac{\xi}{N}\right)(m-p)\right|,\ \xi = 0, \ldots, N-1$$

$\xi$ represents the velocity ambiguity coefficient. $\phi$ represents the spatial phase difference between the first beam and the second beam, or represents the Doppler phase difference (in this case, the Doppler phase difference is equal to the spatial phase difference between the first beam and the second beam). $f_{damb}$ represents the ambiguous Doppler frequency shift obtained after 2D-FFT. $T_r$ represents the transmit period of the chirp signal, or represents the time interval of adjacent chirp signals. N represents the quantity of TDM groups of transmit antennas in the detection apparatus. m represents a TDM group identifier for transmitting a signal for the first time when the first transmit antenna transmits signals in a time division manner. p represents a TDM group identifier for transmitting a signal for the second time when the first transmit antenna transmits signals in a time division manner.

Then, the detection apparatus may determine the true Doppler frequency shift based on the velocity ambiguity coefficient. The detection apparatus may determine the velocity and/or the angle of the target object based on the true Doppler frequency shift. For a specific process, refer to the foregoing description. Details are not described herein again.

In Example 2, a same antenna transmits signals in two TDM groups, which can effectively mitigate impact of array and antenna errors and the like on TDM-MIMO velocity ambiguity resolution performance.

Figure 9:
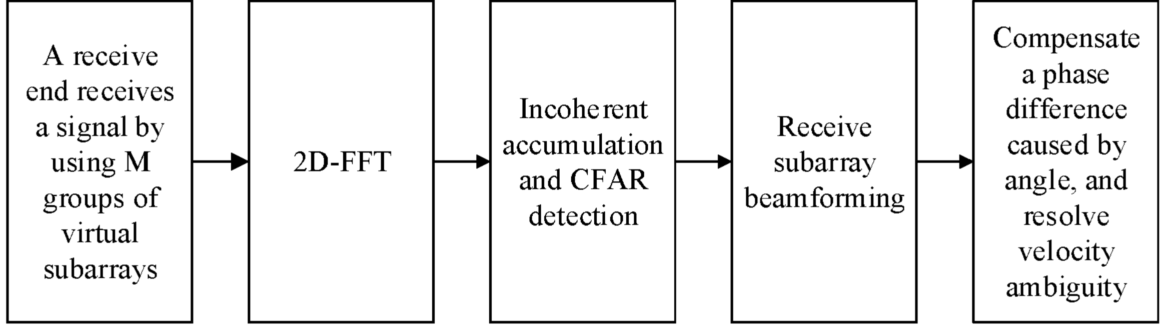
FIG. 9 shows a signal processing procedure according to an embodiment of this application.

For example, for the procedure shown in FIG. 4, as shown in FIG. 9, this application further provides a signal processing procedure: A receive end of a detection apparatus receives signals by using M groups of virtual subarrays, where each group of virtual subarrays includes one or more virtual array elements. Optionally, the detection apparatus determines M TDM groups of transmit antennas, and transmits signals in different TDM groups in a time division manner. Signals transmitted in different TDM groups are reflected by a target to form reflected signals. The receive end of the detection apparatus may receive, by using the M groups of virtual subarrays, the signals corresponding to the M TDM groups. Then, 2-dimensional fast Fourier transform (2D-FFT) is separately performed for signals received by each group of virtual subarrays. Incoherent accumulation and constant false alarm rate (CFAR) detection are performed on data of each group of virtual subarrays obtained after 2D-FFT, to obtain a plurality of detected targets. A possible target position and possible velocity information are obtained. At the detected target position, beamforming is performed on the signals received by each group of virtual subarrays, to find an estimated position of a target angle. A phase difference between two beams caused by a spatial angle is compensated, a Doppler-caused phase difference is calculated, and a velocity ambiguity coefficient is calculated by using the Doppler-caused phase difference, thereby resolving velocity ambiguity.

In this embodiment of this application, overlapping array elements are not required for resolving TDM-MIMO velocity ambiguity, which is little affected by an array error, and a higher signal-to-noise ratio can be accumulated, thereby improving ambiguity resolution performance. In addition, mutual interference between different velocity ambiguity targets at a same distance and velocity level is filtered out by using beamforming, thereby improving a success probability of velocity ambiguity.

It can be understood that, in the foregoing method embodiments, the methods and operations implemented by the detection apparatus may also be implemented by a part (for example, a chip or a circuit) of the detection apparatus.

In the foregoing method embodiments, the methods provided in the embodiments of this application are described from the perspective of the detection apparatus. To implement the functions in the methods provided in the foregoing embodiments of this application, the detection apparatus may include a hardware structure and/or a software unit, and the foregoing functions are implemented in the form of a hardware structure, a software unit, or both a hardware structure and a software unit. Whether a function of the foregoing functions is performed by a hardware structure, or a software unit, or both a hardware structure and a software unit depends on particular applications and design constraints of the technical solutions.

The method provided in embodiments of this application is described above in detail with reference to FIG. 1 to FIG. 9. The following describes in detail apparatuses provided in embodiments of this application with reference to FIG. 10 and FIG. 11. It should be understood that description of the apparatus embodiment corresponds to the description of the method embodiment. Therefore, for content not described in detail, refer to the descriptions in the foregoing method embodiment.

Figure 10:
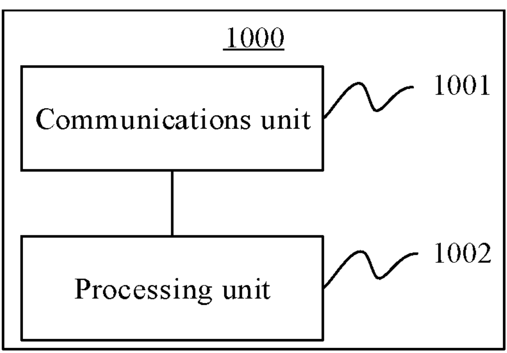
FIG. 10 is a schematic diagram of a structure of an apparatus according to an embodiment of this application.

FIG. 10 is a schematic block diagram of an apparatus 1000 according to an embodiment of this application. The apparatus 1000 is configured to implement the functions of the detection apparatus in the foregoing method. For example, the apparatus may be a software module or a chip system. The chip system may include a chip, or may include a chip and another discrete device. The apparatus 1000 may include a communications unit 1001 and a processing unit 1002. The communications unit 1001 may communicate with the outside. The processing unit 1002 is used for processing. The communications unit 1001 may also be referred to as a communications interface, a transceiver unit, an input/output interface, or the like. For example, the communications unit 1001 may include a sending unit and/or a receiving unit, and the like, and is configured to perform the sending or receiving steps of the detection apparatus in the procedure shown in FIG. 4.

In an example, the apparatus 1000 may implement the steps performed by the detection apparatus corresponding to the procedure shown in FIG. 4, and the apparatus 1000 may be a vehicle-mounted terminal, or a chip or circuit configured in the vehicle-mounted terminal. Alternatively, the apparatus 1000 may be a radar, or a chip or circuit configured in the radar, and the radar may be a millimeter wave radar or the like. Alternatively, the apparatus 1000 may be a vehicle-mounted central processing unit, or a chip or circuit or the like configured in the vehicle-mounted central processing unit. Alternatively, the apparatus 1000 may be a smart cockpit domain controller (CDC), or a chip or circuit or the like configured in the CDC.

The communications unit 1001 is configured to perform receiving and sending related operations of the detection apparatus in the foregoing method embodiment, and the processing unit 1002 is configured to perform processing-related operations of the detection apparatus in the foregoing method embodiment.

For example, the communications unit 1001 is configured to receive at least one first signal corresponding to a first transmit antenna. The processing unit 1002 is configured to perform beamforming processing on the at least one first signal to generate a first beam, and determine information about a first target based on a phase of the first beam and a phase of a second beam. The second beam corresponds to at least one second signal received by the detection apparatus, and there is a first time difference between the first beam and the second beam.

Optionally, the second beam is generated after beamforming processing is performed on the at least one second signal.

Optionally, when determining the information about the first target based on the phase of the first beam and the phase of the second beam, the processing unit 1002 is specifically configured to: determine a Doppler phase difference based on the phase of the first beam and the phase of the second beam, and determine the information about the first target based on the Doppler phase difference.

Optionally, the at least one second signal corresponds to a second transmit antenna. When determining the Doppler phase difference based on the phase of the first beam and the phase of the second beam, the processing unit 1002 is specifically configured to: determine a first phase difference based on the phase of the first beam and the phase of the second beam; determine a second phase difference based on a phase of the first transmit antenna and a phase of the second transmit antenna; and determine the Doppler phase difference based on the first phase difference and the second phase difference.

Optionally, the at least one first signal corresponds to a first virtual subarray, and the at least one second signal corresponds to a second virtual subarray.

Optionally, the at least one second signal corresponds to the first transmit antenna, and when determining the Doppler phase difference based on the phase of the first beam and the phase of the second beam, the processing unit 1002 is specifically configured to: determine the first phase difference based on the phase of the first beam and the phase of the second beam, and determine the Doppler phase difference based on the first phase difference.

Optionally, both the at least one first signal and the at least one second signal correspond to the first virtual subarray.

Optionally, a first pointing angle of the first beam and a second pointing angle of the second beam indicate the first target, and/or an angle difference between the first pointing angle of the first beam and the second pointing angle of the second beam is less than or equal to a first threshold, and/or a difference between energy of the first beam and energy of the second beam is less than or equal to a second threshold.

Optionally, the information about the first target includes at least one of the angle, the velocity, or the distance of the first target.

Optionally, the first time difference is a time difference between different TDM groups.

Unit division in this embodiment of this application is an example, and is merely logical function division. In actual implementation, another division manner may be used. In addition, functional units in this embodiment of this application may be integrated into one processor, or each of the units may exist alone physically, or two or more units are integrated into one unit. The integrated unit may be implemented in a form of hardware, or may be implemented in a form of a software functional unit.

It can be understood that functions of the communications unit in the foregoing embodiment may be implemented by using a transceiver, and functions of the processing unit may be implemented by using a processor. The transceiver may include a transmitter and/or a receiver, respectively configured to implement functions of the sending unit and/or the receiving unit. The following is described with examples with reference to FIG. 11.

Figure 11:
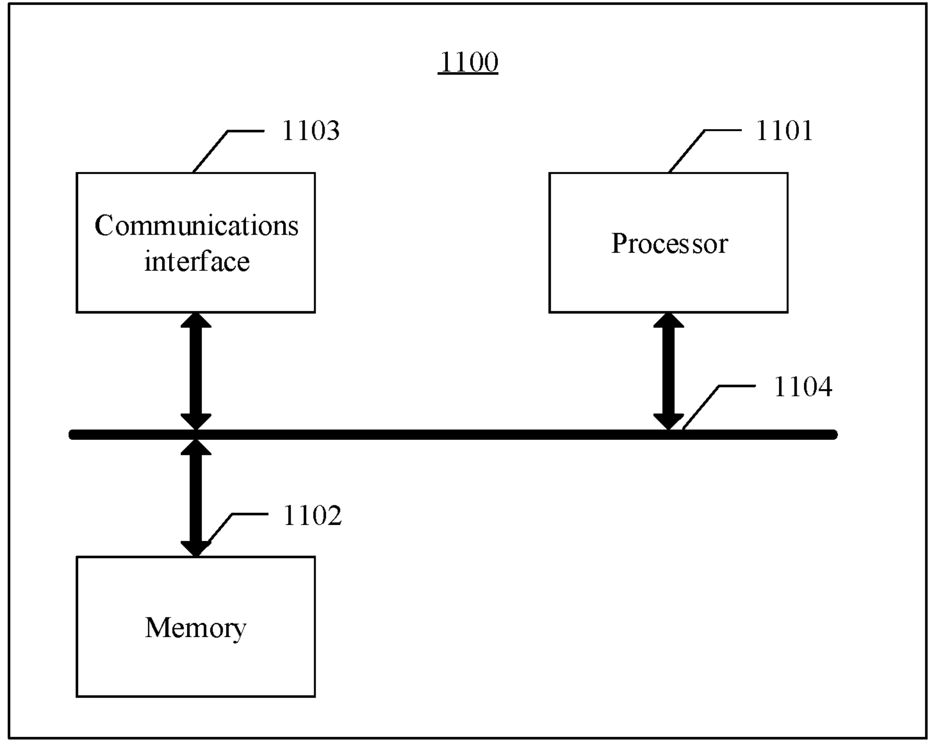
FIG. 11 is a schematic diagram of another structure of an apparatus according to an embodiment of this application.

FIG. 11 is a schematic block diagram of an apparatus 1100 according to an embodiment of this application. The apparatus 1100 shown in FIG. 11 may be a hardware circuit implementation of the apparatus shown in FIG. 10. The apparatus may be applied to the procedure shown in FIG. 4, to perform functions of the detection apparatus in the method embodiment. For ease of explanation, FIG. 11 shows only main components of the apparatus.

The apparatus 1100 shown in FIG. 11 includes at least one processor 1101. The apparatus 1100 may further include at least one memory 1102, configured to store program instructions and/or data. The memory 1102 is coupled to the processor 1101. The coupling in this embodiment of this application is indirect coupling or a communications connection between apparatuses, units, or modules, may be in electrical, mechanical or other forms, and is used for information exchange between apparatuses, units or modules. The processor 1101 may cooperate with the memory 1102. The processor 1101 may execute the program instructions stored in the memory 1102, and at least one of the at least one memory 1102 may be included in the processor 1101.

The apparatus 1100 may further include a communications interface 1103, configured to communicate with other devices through a transmission medium, so that the apparatus 1100 may communicate with other devices. In this embodiment of this application, the communications interface may be a transceiver, a circuit, a bus, a module, or another type of communications interface. In this embodiment of this application, when the communications interface is a transceiver, the transceiver may include a separate receiver and a separate transmitter; or may be a transceiver with integrated transceiver functions, or an interface circuit. Optionally, the communications interface may be an antenna, and the antenna includes at least one receive antenna and at least one transmit antenna.

It should be understood that a connection medium between the processor 1101, the memory 1102, and the communications interface 1103 is not limited in this embodiment of this application. In this embodiment of this application, the memory 1102, the processor 1101, and the communications interface 1103 are connected through a communications bus 1104 in FIG. 11. The bus is represented by a thick line in FIG. 11, and connections between other components are merely examples for description, and shall not be construed as a limitation. The bus may include an address bus, a data bus, a control bus, and the like. For ease of representation, in FIG. 11, only one thick line is used to represent the bus, but it does not indicate that there is only one bus or only one type of bus or the like.

In an example, the apparatus 1100 is configured to implement the steps performed by the detection apparatus in the procedure shown in FIG. 4. The communications interface is configured to perform receiving and sending related operations of the detection apparatus in the foregoing method embodiment, and the processor is configured to perform processing-related operations of the detection apparatus in the foregoing method embodiment.

The communications unit 1103 is configured to receive at least one first signal corresponding to a first transmit antenna. The processor 1101 is configured to perform beamforming processing on the at least one first signal to generate a first beam, and determine information about a first target based on a phase of the first beam and a phase of a second beam. The second beam corresponds to at least one second signal received by the detection apparatus, there is a first time difference between the first beam and the second beam.

Optionally, the second beam is generated after beamforming processing is performed on the at least one second signal.

Optionally, when determining the information about the first target based on the phase of the first beam and the phase of the second beam, the processor 1101 is specifically configured to: determine a Doppler phase difference based on the phase of the first beam and the phase of the second beam, and determine the information about the first target based on the Doppler phase difference.

Optionally, the at least one second signal corresponds to a second transmit antenna, and when determining the Doppler phase difference based on the phase of the first beam and the phase of the second beam, the processor 1101 is specifically configured to:

determine a first phase difference based on the phase of the first beam and the phase of the second beam, determine a second phase difference based on a phase of the first transmit antenna and a phase of the second transmit antenna; and determine the Doppler phase difference based on the first phase difference and the second phase difference.

Optionally, the at least one first signal corresponds to a first virtual subarray, and the at least one second signal corresponds to a second virtual subarray.

Optionally, the at least one second signal corresponds to the first transmit antenna, and when determining the Doppler phase difference based on the phase of the first beam and the phase of the second beam, the processor 1101 is specifically configured to: determine a first phase difference based on the phase of the first beam and the phase of the second beam, and determine the Doppler phase difference based on the first phase difference.

Optionally, both the at least one first signal and the at least one second signal correspond to the first virtual subarray.

Optionally, a first pointing angle of the first beam and a second pointing angle of the second beam indicate the first target, and/or an angle difference between the first pointing angle of the first beam and the second pointing angle of the second beam is less than or equal to a first threshold, and/or a difference between energy of the first beam and energy of the second beam is less than or equal to a second threshold.

Optionally, the information about the first target includes at least one of the angle, the velocity, or the distance of the first target.

Optionally, the first time difference is a time difference between different TDM groups.

Further, an embodiment of this application further provides an apparatus, including units configured to implement the method in FIG. 4. Alternatively, the apparatus includes a processor and an interface circuit, and the processor is configured to communicate with other apparatuses through the interface circuit, and perform the method shown in FIG. 4. Alternatively, the apparatus includes a processor, configured to invoke a program stored in a memory, so as to perform the method in FIG. 4. A readable storage medium is further provided, including instructions, and when the instructions are run on a computer, the computer is enabled to perform the method in FIG. 4. A chip system is further provided. The chip system includes a processor, may further include a memory, and is configured to implement the method in FIG. 4. The chip system may include a chip, or may include a chip and another discrete device. A computer program product is further provided, including instructions, and when the instructions are run on a computer, the computer is enabled to perform the designed method in FIG. 4.

An embodiment of this application further provides a sensor. The sensor includes the apparatus shown in FIG. 10 or FIG. 11, and the sensor is a radar, for example, a millimeter wave radar.

An embodiment of this application further provides a sensor system, including at least one sensor, and the sensor may include the apparatus shown in FIG. 10 or FIG. 11. Further, the at least one sensor includes at least one radar, for example, a millimeter wave radar.

An embodiment of this application further provides a vehicle. In a design, the vehicle includes at least one sensor, and the sensor may include the apparatus shown in FIG. 10 or FIG. 11. For a specific implementation process of the apparatus in FIG. 10 or FIG. 11, refer to the description of FIG. 10 or FIG. 11. Details are not described herein again. In another design, the vehicle includes the apparatus shown in FIG. 10 or FIG. 11. The apparatus may be provided separately, or may be integrated into at least one sensor included in the vehicle, or integrated in a smart cockpit domain controller (CDC) or a vehicle-mounted central processing unit included in the vehicle.

In embodiments of this application, the processor may be a general purpose processor, a digital signal processor, an application-specific integrated circuit, a field programmable gate array or another programmable logical device, a discrete gate or transistor logic device, or a discrete hardware component, and may implement or perform the method, steps, and logical block diagrams disclosed in the embodiments of this application. The general purpose processor may be a microprocessor or any conventional processor or the like. Steps of the method disclosed with reference to the embodiments of this application may be directly executed and accomplished by a hardware processor, or may be executed and accomplished by a combination of hardware and software modules in a processor.

In this embodiment of this application, the memory may be a non-volatile memory, such as a hard disk drive (HDD) or a solid-state drive (SSD), or may be a volatile memory, such as a random-access memory (RAM). The memory is, but not limited to, any other medium that can be used to carry or store desired program code in a form of instructions or data structures and that can be accessed by a computer. The memory in the embodiments of this application may also be a circuit or any other apparatus capable of implementing a storage function, and is configured to store program instructions and/or data.

All or a part of the method provided in the embodiments of this application may be implemented by using software, hardware, firmware, or any combination thereof. When software is used for implementation, the method may be implemented completely or partially in a form of a computer program product. The computer program product includes one or more computer instructions. When the computer program instructions are loaded and executed on the computer, the procedure or functions described in the embodiments of the present invention are all or partially generated. The computer may be a general-purpose computer, a special-purpose computer, a computer network, a network device, user equipment, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, and microwave, or the like) manner. The computer-readable storage medium may be any usable medium accessible by a computer, or a data storage device, such as a server or a data center, integrating one or more usable media. The usable media may be a magnetic medium (for example, a floppy disk, a hard disk drive, or a magnetic tape), an optical medium (for example, a digital video disc (DVD for short)), or a semiconductor medium (for example, an SSD), or the like.

It is clear that a person skilled in the art may make various modifications and variations to this application without departing from the scope of this application. Therefore, this application is intended to cover these modifications and variations, provided that they fall within the scope of the claims of this application and their equivalent technologies.

What is claimed is:

1. A signal processing method applied to a detection apparatus, wherein the detection apparatus includes a first transmit antenna and a second transmit antenna, and a receive antenna array of the detection apparatus includes a first virtual subarray and a second virtual subarray, the method comprises:

transmitting, by the first transmit antenna, a first signal which reaches a first target and is reflected by the first target to form a first reflected signal;

receiving, by the first virtual subarray, the first reflected signal;

transmitting, by the second transmit antenna, a second signal which reaches the first target and is reflected by the first target to form a second reflected signal;

receiving, by the second virtual subarray, the second reflected signal;

performing, by the detection apparatus, beamforming processing on the first reflected signal to generate a first beam;

performing, by the detection apparatus, beamforming processing on the second reflected signal to generate a second beam;

determining, by the detection apparatus, information about the first target based on a phase of the first beam and a phase of the second beam, including determining a Doppler phase difference based on the phase of the first beam and the phase of the second beam;

wherein the Doppler phase difference is determined based on a second phase difference which is a spatial phase difference $\phi_s$ between the first transmit antenna and the second transmit antenna of the detection apparatus, and meets the following condition:

$$\phi_s = 2\pi\frac{d_{Tx}\sin\hat{\theta}}{\lambda}$$

wherein $\phi_s$ represents the spatial phase difference between the first transmit antenna and the second transmit antenna, $\hat{\theta}$ represents a pointing angle of the first beam and the second beam, $\lambda$ represents a wavelength, and $d_{TX}$ represents a physical distance between the first transmit antenna and the second transmit antenna;

wherein there is a first time difference between the first beam and the second beam; and wherein an angle difference between a first pointing angle of the first beam and a second pointing angle of the second beam is less than or equal to a first threshold.

2. The method according to claim 1, wherein the determining the Doppler phase difference based on the phase of the first beam and the phase of the second beam comprises:

determining, by the detection apparatus, a first phase difference based on the phase of the first beam and the phase of the second beam; and determining, by the detection apparatus, the Doppler phase difference based on the first phase difference and the second phase difference.

3. The method according to claim 1, wherein the determining the Doppler phase difference based on the phase of the first beam and the phase of the second beam comprises:

determining, by the detection apparatus, a first phase difference based on the phase of the first beam and the phase of the second beam; and determining, by the detection apparatus, the Doppler phase difference based on the first phase difference.

4. The method according to claim 3, wherein the first reflected signal and the second reflected signal correspond to the first virtual subarray.

5. The method according to claim 1, wherein the first pointing angle of the first beam and the second pointing angle of the second beam indicate the first target.

6. The method according to claim 1, wherein the information about the first target comprises at least one of an angle, a speed, or a distance of the first target.

7. The method according to claim 1, wherein the first time difference is a time difference between different time division multiplexing (TDM) groups.

8. The method according to claim 1, wherein a difference between energy of the first beam and energy of the second beam is less than or equal to a second threshold.

9. The method according to claim 1, wherein the first virtual subarray includes a plurality of virtual array elements receiving a plurality of first reflected signals, the method further comprises:

performing, by the detection apparatus, Fourier transform on the plurality of first reflected signals to obtain a plurality of beams; and selecting, by the detection apparatus from the plurality of beams, a beam with strongest energy as the first beam.

10. The method according to claim 1, wherein the second virtual subarray includes a plurality of virtual array elements receiving a plurality of second reflected signals, the method further comprises:

performing, by the detection apparatus, Fourier transform on the plurality of second reflected signals to obtain a plurality of beams; and selecting, by the detection apparatus from the plurality of beams, a beam with strongest energy as the second beam.

11. An apparatus comprising:

a first transmit antenna and a second transmit antenna;

a receive antenna array which includes a first virtual subarray and a second virtual subarray;

one or more processors, and a non-transitory storage medium in communication with the one or more processors, the non-transitory storage medium configured to store program instructions, wherein, when executed by the one or more processors, the instructions cause the apparatus to:

transmit, by the first transmit antenna, a first signal which reaches a first target and is reflected by the first target to form a first reflected signal;

receive, by the first virtual subarray, the first reflected signal;

transmit, by the second transmit antenna, a second signal which reaches the first target and is reflected by the first target to form a second reflected signal;

receive, by the second virtual subarray, the second reflected signal;

perform beamforming processing on the first reflected signal to generate a first beam;

perform beamforming processing on the second reflected signal to generate a second beam;

determine information about the first target based on a phase of the first beam and a phase of a second beam, including determining a Doppler phase difference based on the phase of the first beam and the phase of the second beam;

wherein the Doppler phase difference is determined based on a second phase difference which is a spatial phase difference $\phi_s$ between the first transmit antenna and the second transmit antenna of the apparatus, and meets the following condition:

$$\phi_s = 2\pi\frac{d_{Tx}\sin\hat{\theta}}{\lambda}$$

wherein $\phi_s$ represents the spatial phase difference between the first transmit antenna and the second transmit antenna, $\hat{\theta}$ represents a pointing angle of the first beam and the second beam, $\lambda$ represents a wavelength, and $d_{Tx}$ represents a physical distance between the first transmit antenna and the second transmit antenna;

wherein there is a first time difference between the first beam and the second beam; and wherein an angle difference between a first pointing angle of the first beam and a second pointing angle of the second beam is less than or equal to a first threshold.

12. The apparatus according to claim 11, wherein the instructions further cause the apparatus to:

determine a first phase difference based on the phase of the first beam and the phase of the second beam; and determine the Doppler phase difference based on the first phase difference and the second phase difference.

13. The apparatus according to claim 11, wherein the instructions further cause the apparatus to:

determine a first phase difference based on the phase of the first beam and the phase of the second beam; and determine the Doppler phase difference based on the first phase difference.

14. The apparatus according to claim 13, wherein the first reflected signal and second reflected signal correspond to the first virtual subarray.

15. The apparatus according to claim 11, wherein the first pointing angle of the first beam and the second pointing angle of the second beam indicate the first target.

16. The apparatus according to claim 11, wherein the information about the first target comprises at least one of an angle, a speed, or a distance of the first target.

17. The apparatus according to claim 11, wherein the first time difference is a time difference between different time division multiplexing (TDM) groups.

18. The apparatus according to claim 11, wherein a difference between energy of the first beam and energy of the second beam is less than or equal to a second threshold.

19. The apparatus according to claim 11, wherein the first virtual subarray includes a plurality of virtual array elements receiving a plurality of first reflected signals, and the instructions further cause the apparatus to:

perform, Fourier transform on the plurality of first reflected signals to obtain a plurality of beams; and select, from the plurality of beams, a beam with strongest energy as the first beam.

20. The apparatus according to claim 11, wherein the second virtual subarray includes a plurality of virtual array elements receiving a plurality of second reflected signals, and the instructions further cause the apparatus to:

perform, Fourier transform on the plurality of second reflected signals to obtain a plurality of beams; and select, from the plurality of beams, a beam with strongest energy as the second beam.

* * * * *